United States Patent
He et al.

(10) Patent No.: US 11,796,709 B2
(45) Date of Patent: Oct. 24, 2023

(54) DETECTION COIL, DETECTION APPARATUS, AND DETECTION SYSTEM

(71) Applicant: Huawei Technologies Co., Ltd., Shenzhen (CN)

(72) Inventors: Mou He, Fuzhou (CN); Wei Chen, Fuzhou (CN); Yongfa Zhu, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 497 days.

(21) Appl. No.: 17/096,054

(22) Filed: Nov. 12, 2020

(65) Prior Publication Data

US 2021/0063599 A1    Mar. 4, 2021

Related U.S. Application Data

(63) Continuation of application No. PCT/CN2019/076367, filed on Feb. 27, 2019.

(30) Foreign Application Priority Data

Jun. 19, 2018 (CN) .......................... 201810631327.7

(51) Int. Cl.
*G01V 3/10* (2006.01)
*H02J 50/80* (2016.01)
(Continued)

(52) U.S. Cl.
CPC .............. *G01V 3/104* (2013.01); *G01V 3/081* (2013.01); *G01V 3/38* (2013.01); *H02J 50/10* (2016.02); *H02J 50/60* (2016.02); *H02J 50/80* (2016.02)

(58) Field of Classification Search
CPC .......... G01V 3/104; G01V 3/081; G01V 3/38; G01V 3/107; G01V 3/10; G01V 3/101;
(Continued)

(56) References Cited

U.S. PATENT DOCUMENTS 3,882,374 A    5/1975    McDaniel
5,434,372 A    7/1995    Lin
(Continued)

FOREIGN PATENT DOCUMENTS

CN    101031822 A    9/2007
CN    103308948 A    9/2013
(Continued)

OTHER PUBLICATIONS

Anonymous: "Faradays law of induction", Wikipedia, Jun. 11, 2018, Retrieved from the Internet: URL:https://en.wikipedia.org/w/index.php?title=Faraday%27s_law_of_inductionandoldid=84 5393486, 11 pages. XP055800303.

*Primary Examiner* — Daniel R Miller
(74) *Attorney, Agent, or Firm* — Conley Rose, P.C.

(57) ABSTRACT

A detection coil includes a first group of coils, a second group of coils, and a third group of coils that are continuously wound and coaxial, and the second group of coils is located between the first group of coils and the third group of coils. A coil that generates the first magnetic field is coaxial with the first group of coils, the second group of coils, and the third group of coils. A sum of the induced electromotive forces of the first group of coils, the second group of coils, and the third group of coils is zero. When a metal foreign matter exists, a sum of the induced electromotive forces of the first group of coils, the second group of coils, and the third group of coils is not zero.

20 Claims, 7 Drawing Sheets

(51) Int. Cl.
*H02J 50/10* (2016.01)
*H02J 50/60* (2016.01)
*G01V 3/08* (2006.01)
*G01V 3/38* (2006.01)

(58) Field of Classification Search
CPC . H02J 50/10; H02J 50/60; H02J 50/80; H01F 38/14; B60L 53/124; B60L 53/122; B60K 6/28; B60Y 2200/91; B60Y 2200/92; B60Y 2300/91; Y02T 10/70; Y02T 10/7072; Y02T 90/14
See application file for complete search history.

(56) References Cited

U.S. PATENT DOCUMENTS

| | | | |
|---|---|---|---|
| 9,442,172 B2 | 9/2016 | Verghese et al. | |
| 10,571,593 B2 | 2/2020 | Jiang | |
| 2007/0222437 A1 | 9/2007 | Haase | |
| 2008/0054892 A1 | 3/2008 | Skultety-Betz et al. | |
| 2008/0297107 A1 | 12/2008 | Kato et al. | |
| 2013/0069441 A1 | 3/2013 | Verghese et al. | |
| 2013/0241302 A1 | 9/2013 | Miyamoto et al. | |
| 2014/0339907 A1 | 11/2014 | Omae et al. | |
| 2015/0323694 A1* | 11/2015 | Roy | G01V 3/081 307/104 |
| 2015/0362614 A1 | 12/2015 | Obayashi et al. | |
| 2016/0006260 A1 | 1/2016 | Nakamura et al. | |
| 2016/0028268 A1 | 1/2016 | Fisher-Jeffes et al. | |
| 2016/0238731 A1* | 8/2016 | Chopra | G01V 3/101 |
| 2017/0016937 A1 | 1/2017 | Riehl et al. | |
| 2017/0248726 A1 | 8/2017 | Adachi | |
| 2017/0363763 A1 | 12/2017 | Yamamoto et al. | |
| 2018/0309327 A1 | 10/2018 | Miyamoto et al. | |
| 2019/0011591 A1 | 1/2019 | Takahashi et al. | |
| 2019/0280533 A1* | 9/2019 | Lee | G01V 3/087 |

FOREIGN PATENT DOCUMENTS

| | | |
|---|---|---|
| CN | 103728365 A | 4/2014 |
| CN | 104167825 A | 11/2014 |
| CN | 104242477 A | 12/2014 |
| CN | 105182427 A | 12/2015 |
| CN | 105182428 A | 12/2015 |
| CN | 105281442 A | 1/2016 |
| CN | 105301665 A | 2/2016 |
| CN | 105379056 A | 3/2016 |
| CN | 106353556 A | 1/2017 |
| CN | 106560730 A | 4/2017 |
| CN | 107306054 A | 10/2017 |
| CN | 107370249 A | 11/2017 |
| CN | 105005082 B | 2/2018 |
| CN | 107710024 A | 2/2018 |
| CN | 107831547 A | 3/2018 |
| CN | 109143382 A | 1/2019 |
| DE | 19850749 C1 | 3/2000 |
| GB | 2262606 A | 6/1993 |
| JP | 2009092599 A | 4/2009 |
| JP | 2016140179 A | 8/2016 |
| WO | 2014103222 A1 | 7/2014 |

* cited by examiner

DETECTION COIL, DETECTION APPARATUS, AND DETECTION SYSTEM

CROSS-REFERENCE TO RELATED DISCLOSURES

This application is a continuation of International Patent Application No. PCT/CN2019/076367, filed on Feb. 27, 2019, which claims priority to Chinese Patent Application No. 201810631327.7, filed on Jun. 19, 2018, both of which are hereby incorporated by reference in its entireties.

TECHNICAL FIELD

This disclosure relates to the field of communications technologies, and in particular, to a detection coil, a detection apparatus, and a detection system.

BACKGROUND

Wireless power transfer (WPT) refers to a technology where electrical energy is converted into relay energy (such as electromagnetic field energy, laser, microwave, and mechanical wave) in another form using a transmit apparatus, and the relay energy after being transmitted for a distance is converted into the electrical energy using a receive apparatus. The WPT technology develops rapidly in commercialization, for example, a consumer electronics product and an electric vehicle field.

Currently, in a wireless power transfer implementation, a high frequency magnetic field is usually generated using a transmit coil, and energy is transmitted to a receive coil in the high frequency magnetic field. An eddy effect is caused to a metal in the high frequency magnetic field, to generate an induced current in the metal. However, the induced eddy current generated in the metal generates a reverse eddy current magnetic field. If a metal foreign matter exists in a wireless power transfer working region, transmission efficiency of the wireless power transfer is affected due to an effect brought by the reverse eddy current magnetic field of the metal foreign matter. In addition, an eddy current loss of the metal foreign matter causes foreign matter heating, thereby causing damage to an apparatus, bringing an irreversible change in severe cases, and even causing a fire.

An existing metal foreign matter is mainly detected using a power difference comparison method. When the metal foreign matter enters a wireless power transfer region, an eddy current is induced for the metal foreign matter in the high frequency magnetic field, thereby causing an electric energy loss in transmission. A difference between receive power of the receive coil and transmit power of the transmit coil is compared to determine whether the metal foreign matter exists. The power difference comparison method is applicable to a case in which the eddy current loss of the metal foreign matter is relatively large. If the eddy current loss of the metal foreign matter can be ignored when being compared with a system transmit power, the method is not applicable.

In conclusion, the existing metal foreign matter detection method has relatively low efficiency.

SUMMARY

This disclosure provides a detection coil, a detection apparatus, and a detection system, to resolve a problem in other approaches that a metal foreign matter detection method has relatively low efficiency.

According to a first aspect, an embodiment of this disclosure provides a detection coil. The detection coil is a planar coil. The detection coil may be divided into three groups of coils that are continuously wound and coaxial, which are respectively a first group of coils, a second group of coils, and a third group of coils. The second group of coils is located between the first group of coils and the third group of coils.

Any group of coils in the three groups of coils includes one turn of coil or a continuously wound multi-turn coil. When any one of the first group of coils, the second group of coils, and the third group of coils includes a continuously wound multi-turn coil, the continuously wound multi-turn coil is coaxial.

A value of a sum of induced electromotive forces generated by the first group of coils and the third group of coils in a first magnetic field is equal to a value of an induced electromotive force generated by the second group of coils in the first magnetic field, and a direction of the sum of the induced electromotive forces generated by the first group of coils and the third group of coils in a first magnetic field is opposite to a direction of the induced electromotive force generated by the second group of coils in the first magnetic field. In other words, a sum of the induced electromotive forces generated by the first group of coils, the second group of coils, and the third group of coils in the first magnetic field is equal to zero.

When a coil used to generate the first magnetic field is disposed, the coil used to generate the first magnetic field is coaxial with the first group of coils, the second group of coils, and the third group of coils.

When a metal foreign matter is being detected, the sum of the induced electromotive forces of the first group of coils, the second group of coils, and the third group of coils may be detected. When it is determined that the sum of the induced electromotive forces is not zero, it is determined that the metal foreign matter exists.

In the foregoing method, because the value of the sum of the induced electromotive forces generated by the first group of coils and the third group of coils in the first magnetic field is equal to the value of the induced electromotive force generated by the second group of coils in the first magnetic field, and the direction of the sum of the induced electromotive forces generated by the first group of coils and the third group of coils in a first magnetic field is opposite to the direction of the induced electromotive force generated by the second group of coils in the first magnetic field. When the metal foreign matter exists, a sum of induced electromotive forces generated by the first group of coils, the second group of coils, and the third group of coils in a magnetic field generated by the metal foreign matter is not zero. This upsets a balance among the induced electromotive forces generated by the first group of coils, the second group of coils, and the third group of coils in the first magnetic field. The sum of the induced electromotive forces generated by the three groups of coils is not zero, to accurately and conveniently determine that the metal foreign matter exists.

In a possible design, when the first group of coils, the second group of coils, and the third group of coils have a same quantity of coil turns, to enable that the sum of the induced electromotive forces of the first group of coils, the second group of coils, and the third group of coils in the first magnetic field is zero, a coil area of each turn of coil in the first group of coils, the second group of coils, and the third group of coils is adjusted according to the following formula $$\Delta\varphi_1 + \Delta\varphi_3 = \Delta\varphi_2,$$

where $\Delta\varphi_1$ is a variation of a magnetic flux of any turn of coil in the first group of coils in the first magnetic field in a time period $\Delta t$, and $\Delta\varphi_1$ is determined based on a magnetic induction intensity of the first magnetic field and a coil area of any turn of coil in the first group of coils, $\Delta\varphi_2$ is a variation of a magnetic flux of any turn of coil in the second group of coils in the first magnetic field in the time period $\Delta t$, and $\Delta\varphi_2$ is determined based on the magnetic induction intensity of the first magnetic field and a coil area of any turn of coil in the second group of coils, and $\Delta\varphi_3$ is a variation of a magnetic flux of any turn of coil in the third group of coils in the first magnetic field in the time period $\Delta t$, and $\Delta\varphi_3$ is determined based on the magnetic induction intensity of the first magnetic field and a coil area of any turn of coil in the third group of coils.

In the foregoing method, the coil area of each turn of coil included in the first group of coils, the second group of coils, and the third group of coils is adjusted, to relatively conveniently and simply implement that the sum of the induced electromotive forces of the first group of coils, the second group of coils, and the third group of coils in the first magnetic field is zero.

In a possible design, when the sum of the induced electromotive forces of the first group of coils, the second group of coils, and the third group of coils in the first magnetic field is zero in a specific implementation, the first group of coils, the second group of coils, and the third group of coils may meet the following formula $$\Delta \int_{S1} Bds + \Delta \int_{S3} Bds = \Delta \int_{S2} Bds,$$

where S1 is the coil area of any turn of coil in the first group of coils, S2 is the coil area of any turn of coil in the second group of coils, S3 is the coil area of any turn of coil in the third group of coils, $$\Delta \int_{S1} Bds$$

is a variation of a magnetic flux of any turn of coil in the first group of coils in the first magnetic field, $$\Delta \int_{S2} Bds$$

is a variation of a magnetic flux of any turn of coil in the second group of coils in the first magnetic field, $$\Delta \int_{S3} Bds$$

is a variation of a magnetic flux of any turn of coil in the third group of coils in the first magnetic field, and B is the magnetic induction intensity of the first magnetic field in an area ds.

In the foregoing method, S1, S2, and S3 are adjusted, to relatively conveniently and simply implement that the sum of the induced electromotive forces of the first group of coils, the second group of coils, and the third group of coils in the magnetic field generated by a transmit coil is zero, thereby efficiently detecting the metal foreign matter.

In a possible design, a quantity of coil turns of the first group of coils is N1, a quantity of coil turns of the second group of coils is N2, and a quantity of coil turns of the third group of coils is N3. Herein, N1, N2, and N3 are all positive integers greater than or equal to 1, N2 is greater than N1, and N2 is greater than N3. The first group of coils, the second group of coils, and the third group of coils meet the following formula $$N1 \times \Delta\varphi_1 + N3 \times \Delta\varphi_3 = N2 \times \Delta\varphi_2,$$

where $\Delta\varphi_1$ is a variation of a magnetic flux of any turn of coil in the first group of coils in the first magnetic field in a time period $\Delta t$, and $\Delta\varphi_1$ is determined based on a magnetic induction intensity of the first magnetic field and a coil area of any turn of coil in the first group of coils, $\Delta\varphi_2$ is a variation of a magnetic flux of any turn of coil in the second group of coils in the first magnetic field in the time period $\Delta t$, and $\Delta\varphi_2$ is determined based on the magnetic induction intensity of the first magnetic field and a coil area of any turn of coil in the second group of coils, and $\Delta\varphi_3$ is a variation of a magnetic flux of any turn of coil in the third group of coils in the first magnetic field in the time period $\Delta t$, and $\Delta\varphi_3$ is determined based on the magnetic induction intensity of the first magnetic field and a coil area of any turn of coil in the third group of coils.

In the foregoing method, quantities of coil turns and a coil area of each turn of coil of the first group of coils, the second group of coils, and the third group of coils are adjusted, to relatively conveniently and simply implement that the sum of the induced electromotive forces of the first group of coils, the second group of coils, and the third group of coils in a magnetic field generated by the transmit coil is zero.

In a possible design, the first group of coils, the second group of coils, and the third group of coils meet the following formula $$N1 \times \Delta \int_{S1} Bds + N3 \times \Delta \int_{S3} Bds = N2 \times \Delta \int_{S2} Bds,$$

where S1 is the coil area of any turn of coil in the first group of coils, S2 is the coil area of any turn of coil in the second group of coils, S3 is the coil area of any turn of coil in the third group of coils, $$\Delta \int_{S1} Bds$$

is a variation of a magnetic flux of any turn of coil in the first group of coils in the first magnetic field, $$\Delta \int_{S2} Bds$$

is a variation of a magnetic flux of any turn of coil in the second group of coils in the first magnetic field, $$\Delta \int_{S3} Bds$$

is a variation of a magnetic flux of any turn of coil in the third group of coils in the first magnetic field, and B is the magnetic induction intensity of the first magnetic field in an area ds.

In the foregoing method, N1, N2, N3, S1, S2, and S3 are adjusted, to relatively conveniently and simply implement that the sum of the induced electromotive forces of the first group of coils, the second group of coils, and the third group of coils in the first magnetic field is zero, thereby efficiently detecting the metal foreign matter.

According to a second aspect, an embodiment of this disclosure provides a detection apparatus. The detection apparatus includes a detection coil, a first voltage divider resistor, and a second voltage divider resistor.

The detection coil is a planar coil, and the detection coil may be divided into three groups of coils that are continuously wound and coaxial, which are respectively a first group of coils, a second group of coils, and a third group of coils. The second group of coils is located between the first group of coils and the third group of coils.

Any group of coils in the three groups of coils includes one turn of coil or a continuously wound multi-turn coil. When any one of the first group of coils, the second group of coils, and the third group of coils includes a continuously wound multi-turn coil, the continuously wound multi-turn coil is coaxial.

One end of the first voltage divider resistor is connected to one end of the first group of coils, the other end of the first voltage divider resistor is connected to one end of the second voltage divider resistor, and the other end of the second voltage divider resistor is connected to one end of the third group of coils. A voltage at two ends of the first voltage divider resistor and the second voltage divider resistor is equal to a voltage of the first group of coils and the third group of coils.

When the detection apparatus is disposed in a first magnetic field, a voltage at two ends of the first voltage divider resistor is equal to a value of an induced electromotive force generated by the second group of coils in the first magnetic field, and a direction of the voltage of at two ends of the first voltage divider resistor is opposite to a direction of the induced electromotive force generated by the second group of coils in the first magnetic field. In other words, a sum of the voltage of the first voltage divider resistor and the induced electromotive force generated by the second group of coils in the first magnetic field is equal to zero.

When a metal foreign matter is being detected, the sum of the voltage at two ends of the first voltage divider resistor and the induced electromotive force of the second group of coils may be detected. In other words, a voltage at two ends one end of the second group of coils and one end of the first voltage divider resistor connected to the second voltage divider resistor is detected. When it is determined that the sum of the voltage at two ends of the first voltage divider resistor and the induced electromotive force of the second group of coils is not zero, it may be determined that the metal foreign matter exists.

In the foregoing method, the voltage of the first voltage divider resistor is equal to the value of the induced electromotive force generated by the second group of coils in the first magnetic field, and the direction of the voltage of at two ends of the first voltage divider resistor is opposite to the direction of the induced electromotive force generated by the second group of coils in the first magnetic field. When the metal foreign matter exists, a magnetic field generated by the metal foreign matter affects induced electromotive forces of the first group of coils, the second group of coils, and the third group of coils such that the detection apparatus can detect that the sum of the voltage of the first voltage divider resistor and the induced electromotive force of the second group of coils is not zero. In this way, it can be accurately and conveniently determined that the metal foreign matter exists.

In a possible design, when the first group of coils, the second group of coils, and the third group of coils have a same quantity of coil turns, to implement that the sum of the voltage of the first voltage divider resistor and the induced electromotive force generated by the second group of coils in the first magnetic field is equal to zero, if a resistance value of the first voltage divider resistor is R1, a resistance value of the second voltage divider resistor is R2, and a sum of resistance values of the first group of coils and the third group of coils is R, sizes of the first group of coils, the second group of coils, and the third group of coils are adjusted such that the first group of coils, the second group of coils, and the third group of coils meet the following formula $$(\Delta\varphi_1 + \Delta\varphi_3) \times \frac{R1}{R1 + R2 + R} = \Delta\varphi_2,$$

where $\Delta\varphi_1$ is a variation of a magnetic flux of any turn of coil in the first group of coils in the first magnetic field in a time period $\Delta t$, and $\Delta\varphi_1$ is determined based on a magnetic induction intensity of the first magnetic field and a coil area of any turn of coil in the first group of coils, $\Delta\varphi_2$ is a variation of a magnetic flux of any turn of coil in the second group of coils in the first magnetic field in the time period $\Delta t$, and $\Delta\varphi_2$ is determined based on the magnetic induction intensity of the first magnetic field and a coil area of any turn of coil in the second group of coils, and $\Delta\varphi_3$ is a variation of a magnetic flux of any turn of coil in the third group of coils in the first magnetic field in the time period $\Delta t$, and $\Delta\varphi_3$ is determined based on the magnetic induction intensity of the first magnetic field and a coil area of any turn of coil in the second group of coils.

In the foregoing method, the coil area of each turn of coil in the first group of coils, the second group of coils, and the third group of coils is adjusted, to relatively conveniently and simply implement that the sum of the voltage of the first voltage divider resistor and the induced electromotive force generated by the second group of coils in the first magnetic field is equal to zero.

In a possible design, when the sum of the voltage of the first voltage divider resistor and the induced electromotive force generated by the second group of coils in the first magnetic field is equal to zero in a specific implementation, the first group of coils, the second group of coils, and the third group of coils meet the following formula $$\left(\Delta \int_{S1} Bds + \Delta \int_{S3} Bds\right) \times \frac{R1}{R1 + R2 + R} = \Delta \int_{S2} Bds,$$

where S1 is the coil area of any turn of coil in the first group of coils, S2 is the coil area of any turn of coil in the second group of coils, S3 is the coil area of any turn of coil in the third group of coils, $$\Delta \int_{S1} Bds$$

is a variation of a magnetic flux of any turn of coil in the first group of coils in the first magnetic field, $$\Delta \int_{S2} Bds$$

is a variation of a magnetic flux of any turn of coil in the second group of coils in the first magnetic field, $$\Delta \int_{S3} Bds$$

is a variation of a magnetic flux of any turn of coil in the third group of coils in the first magnetic field, and B is the magnetic induction intensity of the first magnetic field in an area ds.

In the foregoing method, S1, S2, and S3 are adjusted, to relatively conveniently and simply implement that the sum of the voltage of the first voltage divider resistor and the induced electromotive force generated by the second group of coils in the first magnetic field is equal to zero. In this way, when the metal foreign matter exists, the metal foreign matter can be efficiently detected.

In a possible design, a quantity of coil turns of the first group of coils is N1, a quantity of coil turns of the second group of coils is N2, and a quantity of coil turns of the third group of coils is N3. Herein, N1, N2, and N3 are all positive integers greater than or equal to 1. The first group of coils, the second group of coils, and the third group of coils meet the following formula $$(N1 \times \Delta\varphi_1 + N3 \times \Delta\varphi_3) \times \frac{R1}{R1 + R2 + R} = N2 \times \Delta\varphi_2,$$

where $\Delta\varphi_1$ is a variation of a magnetic flux of any turn of coil in the first group of coils in the first magnetic field in a time period $\Delta t$, and $\Delta\varphi_1$ is determined based on a magnetic induction intensity of the first magnetic field and a coil area of any turn of coil in the first group of coils, $\Delta\varphi_2$ is a variation of a magnetic flux of any turn of coil in the second group of coils in the first magnetic field in the time period $\Delta t$, and $\Delta\varphi_2$ is determined based on the magnetic induction intensity of the first magnetic field and a coil area of any turn of coil in the second group of coils, and $\Delta\varphi_3$ is a variation of a magnetic flux of any turn of coil in the third group of coils in the first magnetic field in the time period $\Delta t$, and $\Delta\varphi_3$ is determined based on the magnetic induction intensity of the first magnetic field and a coil area of any turn of coil in the second group of coils.

In the foregoing method, the quantities of coil turns and the coil area of each turn of coils of the first group of coils, the second group of coils, and the third group of coils are adjusted, to relatively conveniently and simply implement that the sum of the voltage of the first voltage divider resistor and the induced electromotive force generated by the second group of coils in the first magnetic field is equal to zero. In this way, when the metal foreign matter exists, the metal foreign matter can be efficiently detected.

In a possible design, the first group of coils, the second group of coils, and the third group of coils meet the following formula $$\left(N1 \times \Delta \int_{S1} Bds + N3 \times \Delta \int_{S3} Bds\right) \times \frac{R1}{R1 + R2 + R} = N2 \times \Delta \int_{S2} Bds,$$

where S1 is the coil area of any turn of coil in the first group of coils, S2 is the coil area of any turn of coil in the second group of coils, S3 is the coil area of any turn of coil in the third group of coils, $$\Delta \int_{S1} Bds$$

is a variation of a magnetic flux of any turn of coil in the first group of coils in the first magnetic field, $$\Delta \int_{S2} Bds$$

is a variation of a magnetic flux of any turn of coil in the second group of coils in the first magnetic field, $$\Delta \int_{S3} Bds$$

is a variation of a magnetic flux of any turn of coil in the third group of coils in the first magnetic field, and B is the magnetic induction intensity of the first magnetic field in an area ds.

In the foregoing method, N1, N2, N3, S1, S2, and S3 are adjusted, to relatively conveniently and simply implement that the sum of the voltage of the first voltage divider resistor and the induced electromotive force generated by the second group of coils in the magnetic field generated by a transmit coil is equal to zero. In this way, when the metal foreign matter exists, the metal foreign matter can be accurately and efficiently detected.

According to a third aspect, an embodiment of this disclosure provides a detection system. The detection system includes a transmit coil and the detection coil provided in any one of the first aspect and designs of the first aspect.

The transmit coil is centrally symmetrical to the first group of coils, the second group of coils, and the third group of coils. In other words, the transmit coil is coaxial with the first group of coils, the second group of coils, and the third group of coils.

In the foregoing method, a sum of induced electromotive forces generated by the first group of coils, the second group of coils, and the third group of coils in a magnetic field generated by the transmit coil is zero. However, when a metal foreign matter exists around the transmit coil, the sum of the induced electromotive forces of the first group of coils, the second group of coils, and the third group of coils is not zero. Further, it is determined that the metal foreign matter exists, to ensure that the foreign matter can be accurately and efficiently detected using the detection apparatus.

According to a fourth aspect, an embodiment of this disclosure provides a detection system. The detection system includes a transmit coil and the detection coil provided in any one of the second aspect and designs of the second aspect.

The transmit coil is centrally symmetrical to the first group of coils, the second group of coils, and the third group of coils. In other words, the transmit coil is coaxial with the first group of coils, the second group of coils, and the third group of coils.

In the foregoing method, the sum of the voltage at two ends of the first voltage divider resistor and the induced electromotive force of the second group of coils in the magnetic field generated by the transmit coil is zero. However, when the metal foreign matter exists around the transmit coil, the sum of the voltage at two ends of the first voltage divider resistor and the induced electromotive force of the second group of coils is not zero. Further, it is determined that the metal foreign matter exists, to ensure that the foreign matter can be accurately and efficiently detected using the detection apparatus.

DESCRIPTION OF EMBODIMENTS

This disclosure provides a detection coil, a detection apparatus, and a detection system, to resolve a problem in other approaches that a metal foreign matter detection method has relatively low efficiency.

To make the objectives, technical solutions, and advantages of this disclosure clearer, the following further describes this disclosure in detail with reference to the accompanying drawings.

Figure 1:
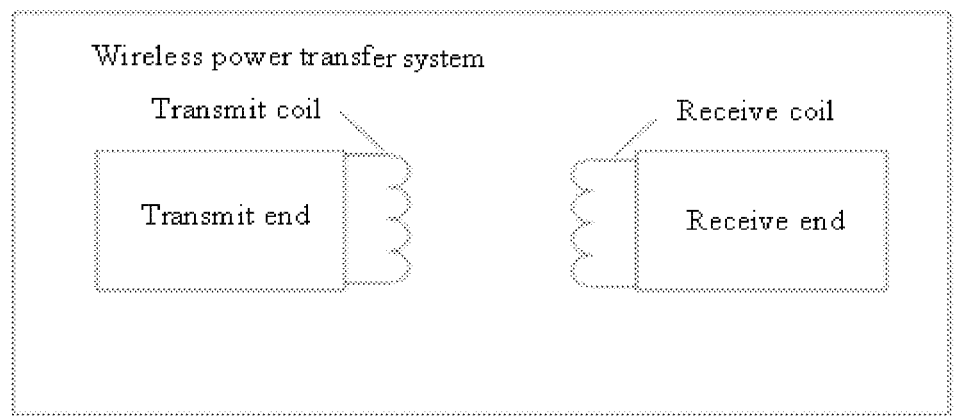
FIG. 1 is a schematic architectural diagram of a wireless power transfer system.

FIG. 1 is a schematic structural diagram of a simple wireless power transfer system. The system includes a transmit end and a receive end. The transmit end is connected to a transmit coil, and the receive end is connected to a receive coil. The transmit end may provide a current for the transmit coil. In this case, the transmit coil generates a magnetic field, and an electromagnetic induction phenomenon occurs for the receive coil in the magnetic field generated by the transmit coil. Therefore, an induced current is generated in the receive coil, to supply electric energy to the receive end.

If a metal foreign matter exists around the transmit coil, because the metal foreign matter has an eddy effect in the magnetic field generated by the transmit coil, an eddy current in the metal foreign matter generates a magnetic field. As a result, transmission efficiency of the wireless power transfer system decreases.

Figure 2:
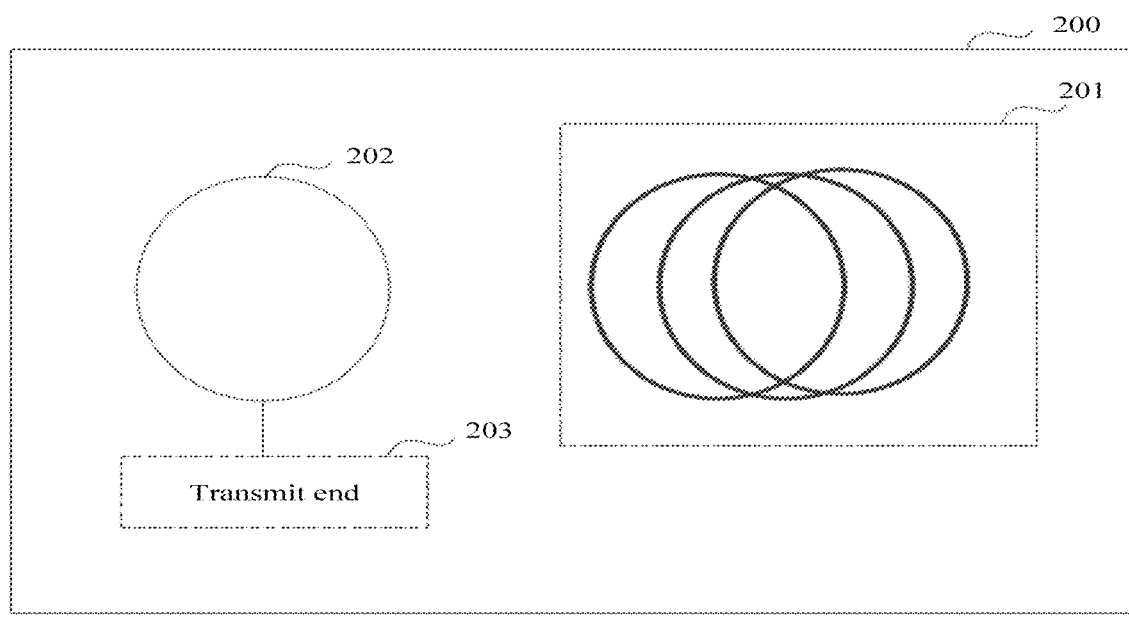
FIG. 2 is a schematic structural diagram of a detection system according to this disclosure.

To efficiently detect a metal foreign matter around the transmit coil, an embodiment of this disclosure provides a detection system. FIG. 2 is a schematic structural diagram of a detection system according to an embodiment of this disclosure. The detection system 200 includes a detection coil 201 and a transmit coil 202.

The detection coil 201 includes a plurality of groups of coils that are continuously wound and coaxial, and the plurality of groups of coils in the detection coil 201 are centrally symmetrical to the transmit coil 202. In an embodiment, the plurality of groups of coils may be disposed in parallel with the transmit coil 202. The plurality of groups of coils and the transmit coil 202 are disposed in parallel such that a magnetic field generated by the transmit coil 202 is symmetrical in a region surrounded by the plurality of groups of coils. In this case, a voltage at two ends of the detection coil 201 is zero. If a metal foreign matter exists, the magnetic field is asymmetrical in the region surrounded by the plurality of groups of coils. In this case, the voltage at the two ends of the detection coil 201 is not zero. The magnetic field in the region surrounded by the plurality of groups of coils includes the magnetic field generated by the transmit coil 202 and a magnetic field generated by the metal foreign matter.

It should be noted that, that any group of coils is centrally symmetrical to the transmit coil in this disclosure means that locations of any group of coils and the transmit coil remain unchanged after the group of coils and the transmit coil are rotated on a same axis by 180 degrees. In an embodiment, the group of coils is coaxial with the transmit coil, and an axis on which a center of the group of coils is located overlaps an axis on which a center of the transmit coil is located.

The detection system 200 may further include a transmit end 203, and the transmit end 203 is connected to the transmit coil 202, to supply electrical energy to the transmit coil 202.

The following describes a detection coil that may be applied to the detection system shown in FIG. 2 such that the detection coil can be applied to a scenario in which wireless power transfer is performed using the transmit coil.

Figure 3:
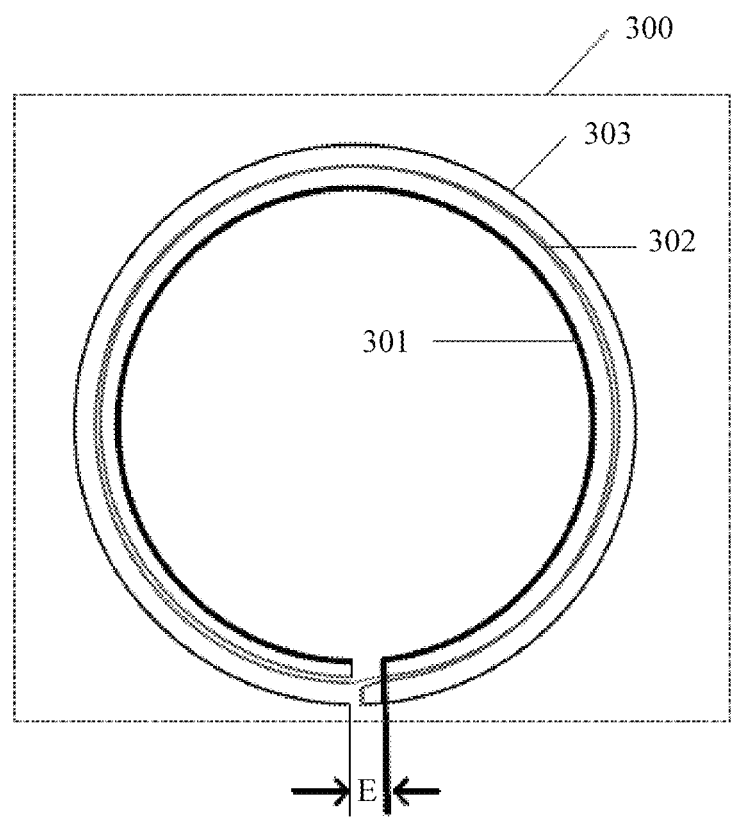
FIG. 3 is a schematic structural diagram of a detection coil according to this disclosure.

FIG. 3 provides a detection coil according to an embodiment of this disclosure. Based on each coil winding direction and a magnitude of an induced electromotive force in the detection coil, the detection coil 300 is a planar coil and may be divided into three groups of coils that are continuously wound and coaxial, which are respectively a first group of coils 301, a second group of coils 302, and a third group of coils 303. The second group of coils 302 is located between the first group of coils 301 and the third group of coils 303.

Specifically, the first group of coils 301, the second group of coils 302, and the third group of coils 303 each include at least one turn of continuously wound coil. When the first group of coils 301, the second group of coils 302, or the third group of coils 303 includes a continuously wound multi-turn coil, the continuously wound multi-turn coil is coaxial.

Based on a location relationship of the three groups of coils, it may be learned that a coil area of any turn of coil in the third group of coils 303 is greater than a coil area of any turn of coil in the second group of coils 302, and the coil area of any turn of coil in the second group of coils 302 is greater than a coil area of any turn of coil in the first group of coils 301.

It should be noted that, for any group of coils in the three groups of coils, when the group of coils is formed by winding a multi-turn coil, the group of coils is tightly wound in a coaxial manner, and turns of coils are close to each other. Coil areas of turns of coils in the group of coils are the same (a coil area of the coil is an area of a region surrounded by the coil). When the group of coils includes the continuously wound multi-turn coil, a relatively thin wire may be used for winding, to form a group of coils. Because the wire is relatively thin, an axial length of the group of coils is relatively small. When three groups of coils are nested to form the detection coil, if the axial length of each group of coils is ignored, the three groups of coils are located in a same plane, and the detection coil is the planar coil.

A value of a sum of induced electromotive forces generated by the first group of coils 301 and the third group of coils 303 in a first magnetic field is equal to a value of an induced electromotive force generated by the second group of coils 302 in the first magnetic field, and a direction of the sum of the induced electromotive forces generated by the first group of coils 301 and the third group of coils 303 in a first magnetic field is opposite to a direction of the induced electromotive force generated by the second group of coils 302 in the first magnetic field.

A location relationship among a coil used to generate the first magnetic field and the three groups of coils meets the following condition. The coil that generates the first magnetic field is coaxial with the first group of coils 301, the second group of coils 302, and the third group of coils 303. In other words, an axis on which centers of the first group of coils 301, the second group of coils 302, and the third group of coils 303 are located overlaps an axis on which a center of the coil used to generate the first magnetic field is located.

When a current passes through the coil used to generate the first magnetic field, the first magnetic field is generated around the coil, and the induced electromotive forces are generated by the first group of coils 301, the second group of coils 302, and the third group of coils 303 in the first magnetic field.

Values of the induced electromotive forces generated by the first group of coils 301, the second group of coils 302, and the third group of coils 303 in the first magnetic field meet the following condition. The sum of the induced electromotive forces generated by the first group of coils 301 and the third group of coils 303 in the first magnetic field is equal to the value of the induced electromotive force generated by the second group of coils 302 in the first magnetic field, and the direction of the sum of the induced electromotive forces generated by the first group of coils 301 and the third group of coils 303 in a first magnetic field is opposite to the direction of the induced electromotive force generated by the second group of coils 302 in the first magnetic field.

In other words, when the three groups of coils are located in the first magnetic field, a sum of the induced electromotive forces generated by the three groups of coils is zero.

The induced electromotive force E1 generated by the first group of coils 301 in the first magnetic field, the induced electromotive force E2 generated by the second group of coils 302 in the first magnetic field, and the induced electromotive force E3 generated by the third group of coils 303 in the first magnetic field meet the following relationship $$E_1 + E_3 = E_2.$$

For each group of coils, an induced electromotive force of each group of coils is related to a quantity of coil turns of each group of coils and a change rate of a magnetic flux of any turn of coil in each group of coils. The magnetic flux is related to a magnetic induction intensity of the first magnetic field and a coil area of any turn of coil.

Specifically, the following relationship exists among the induced electromotive forces generated by the first group of coils 301, the second group of coils 302, and the third group of coils 303 in the first magnetic field.

The value of the induced electromotive force generated by the second group of coils 302 in the first magnetic field is greater than the value of the induced electromotive force generated by the first group of coils 301 in the first magnetic field, and a direction of the induced electromotive force generated by the second group of coils 302 in the first magnetic field is opposite to a direction of the induced electromotive force generated by the first group of coils 301 in the first magnetic field.

The value of the induced electromotive force generated by the second group of coils 302 in the first magnetic field is greater than the value of the induced electromotive force generated by the third group of coils 303 in the first magnetic field, and the direction of the induced electromotive force generated by the second group of coils 302 in the first magnetic field is opposite to a direction of the induced electromotive force generated by the third group of coils 303 in the first magnetic field.

When the detection coil shown in FIG. 3 is applied to the detection system shown in FIG. 2, the transmit coil is centrally symmetrical to the first group of coils 301, the second group of coils 302, and the third group of coils 303. In other words, the transmit coil is coaxial with the first group of coils 301, the second group of coils 302, and the third group of coils 303. In addition, the induced electromotive force generated by the three groups of coils included in the detection coil in the first magnetic field is zero, and the coil that generates the first magnetic field is coaxial with the three groups of coils. In this case, a magnetic field is generated around the transmit coil when the current passes through the transmit coil. In this way, a case in which the magnetic field generated around the transmit coil exists is similar to a case in which the first magnetic field exists. Therefore, when the three groups of coils are located in the magnetic field generated by the transmit coil, the sum of the induced electromotive forces generated by the three groups of coils is also zero.

When a metal foreign matter exists, a sum of induced electromotive forces generated by the first group of coils 301, the second group of coils 302, and the third group of coils 303 in a magnetic field generated by the metal foreign matter is not zero. This upsets a balance among the induced electromotive forces generated by the first group of coils 301, the second group of coils 302, and the third group of coils 303 in the magnetic field generated by the transmit coil. It should be understood that, when the metal foreign matter exists, the induced electromotive force of the first group of coils 301 includes the induced electromotive force that is generated by the first group of coils 301 in the magnetic field generated by the transmit coil and the induced electromotive force that is generated by the first group of coils 301 in the magnetic field generated by the metal foreign matter. Cases of the other two groups of coils are similar to the foregoing case of the first group of coils, and details are not described herein again. If it is detected that the sum of the induced electromotive forces of the three groups of coils is not zero, it may be determined that the metal foreign matter exists.

That the metal foreign matter exists can be accurately and conveniently determined using the detection coil shown in FIG. 3.

The magnetic field generated by the transmit coil refers to the magnetic field generated by a current in the transmit coil. For example, an eddy current is generated in the metal foreign matter due to the current in the transmit coil, therefore, a magnetic field is generated by the eddy current in the metal foreign matter. The magnetic field generated by the metal foreign matter does not belong to the magnetic field generated by the transmit coil. In other words, the magnetic field generated due to an eddy effect does not belong to the magnetic field generated by the transmit coil. In this embodiment of this disclosure, the magnetic field generated by the transmit coil includes only the magnetic field directly generated by the current in the transmit coil.

It should be noted that the coil used to generate the first magnetic field may be an independently disposed coil, and serve as a magnetic field excitation source of the detection coil. In this way, the independently disposed magnetic field excitation source may remove system interference in a wireless power transfer system, thereby further ensuring that the detection coil can accurately detect the metal foreign matter. The coil used to generate the first magnetic field may also be the transmit coil in the wireless power transfer system. In this way, costs may be further reduced. Therefore, the detection coil can be applied to various types of wireless power transmission systems, to conveniently and quickly detect the metal foreign matter.

To implement that the sum of the induced electromotive forces generated by the first group of coils 301 and the third group of coils 303 in the first magnetic field is equal to the value of the induced electromotive force generated by the second group of coils 302 in the first magnetic field, and the direction of the sum of the induced electromotive forces generated by the first group of coils 301 and the third group of coils 303 in a first magnetic field is opposite to the direction of the induced electromotive force generated by the second group of coils 302 in the first magnetic field, a quantity of coil turns of each group of coils and a coil area of each turn of coil in each group of coils may be adjusted, and a winding direction of each group of coils may be changed. The implementations are separately described below.

It should be understood that the coil areas of the turns of coils included in each group of coils are the same. When the group of coils is disposed in the first magnetic field, if the first magnetic field is a uniform magnetic field, variations of magnetic fluxes of turns of coils in each group of coils in the first magnetic field are the same. If the first magnetic field is a non-uniform magnetic field, the variations of the magnetic fluxes of the turns of coils in each group of coils in the first magnetic field are different to some extent (for example, variations of magnetic fluxes of first and last turns of coils in the first magnetic field are different to some extent due to different locations of the turns of coils). However, because a length of each group of coils is relatively small in an axis direction, the variations of the magnetic fluxes of the turns of coils in each group of coils in the first magnetic field are approximately the same. In other words, the variations of the magnetic fluxes of the turns of coils in each group of coils in the first magnetic field may be considered to be the same. In actual calculation, an average value of the variations of the magnetic fluxes of the turns of coils in each group of coils in the first magnetic field may be used to calculate the induced electromotive force of each group of coils, or a variation of a magnetic flux of any turn of coil in each group of coils in the first magnetic field may be used to calculate the induced electromotive force of each group of coils. In this embodiment of this disclosure, an example in which the variation of the magnetic flux of any turn of coil in each group of coils in the first magnetic field is used to calculate the induced electromotive force of each group of coils is used for description. However, this embodiment of this disclosure is not limited thereto. Any manner in which the variation of the magnetic flux of each turn of coil in each group of coils in the first magnetic field is used to calculate the induced electromotive force is applicable to this embodiment of this disclosure.

(1). Adjust the coil area of each turn of coil in each group of coils, and change the winding direction of each turn of coil.

When quantities of coil turns of each group of coils are the same and are all equal to N, the induced electromotive force $E_1$ generated by the first group of coils 301 in the first magnetic field is $$N \times \frac{\Delta \varphi_1}{\Delta t},$$

where $\Delta\varphi_1$ is a variation of a magnetic flux of any turn of coil in the first group of coils 301 in the first magnetic field in a time period $\Delta t$, the induced electromotive force $E_2$ generated by the second group of coils 302 in the first magnetic field is $$N \times \frac{\Delta \varphi_2}{\Delta t},$$

where $\Delta\varphi_2$ is a variation of a magnetic flux of any turn of coil in the second group of coils 302 in the first magnetic field in the time period $\Delta t$, the induced electromotive force $E_3$ generated by the third group of coils 303 in the first magnetic field is $$N \times \frac{\Delta \varphi_3}{\Delta t},$$

where $\Delta\varphi_3$ is a variation of a magnetic flux of any turn of coil in the third group of coils 303 in the first magnetic field in the time period $\Delta t$.

In other words, the induced electromotive force generated by each group of coils in the first magnetic field meets the following formula $$N \times \frac{\Delta \varphi_1}{\Delta t} + N \times \frac{\Delta \varphi_3}{\Delta t} = N \times \frac{\Delta \varphi_2}{\Delta t}.$$

After same parameters are removed, the foregoing formula may be transformed to $$\Delta\varphi_1 + \Delta\varphi_3 = \Delta\varphi_2.$$

In order that the direction of the induced electromotive force generated by the second group of coils 302 in the first magnetic field is opposite to a direction of the induced electromotive force generated by the first group of coils 301 in the first magnetic field, and the direction of the induced electromotive force generated by the second group of coils 302 in the first magnetic field is opposite to a direction of the induced electromotive force generated by the third group of coils 303 in the first magnetic field, the winding direction of each turn of coil in the second group of coils 302 may be opposite to the winding direction of each turn of coil in the first group of coils 301, and the winding direction of each turn of coil in the second group of coils 302 may be opposite to the winding direction of each turn of coil in the third group of coils 303. The winding direction of the coil in this embodiment of this disclosure may be determined based on the winding direction of each turn of coil along the axis. For example, the winding direction is counterclockwise or clockwise. Alternatively, the winding direction of the coil may be determined based on the direction of the induced current in each turn of coil. If a direction of the induced current in the second group of coils 302 is opposite to a direction of the induced current in the first group of coils 301, it indicates that the winding directions of the coils are the same, otherwise, it indicates that the winding directions of the coils are different.

Any manner in which the direction of the induced electromotive force generated by the second group of coils 302 in the first magnetic field is opposite to the induced electromotive force generated by the first group of coils 301 in the first magnetic field and the induced electromotive force generated by the third group of coils 303 in the first magnetic field is applicable to this embodiment of this disclosure.

In this case, that the sum of the induced electromotive forces of the three groups of coils in the first magnetic field is zero can be implemented by simply adjusting the coil area of each turn of coil in the three groups of coils such that a detection apparatus can implement efficient detection of the metal foreign matter.

When the first magnetic field is the non-uniform magnetic field, a magnetic induction intensity B at each point in the first magnetic field is different.

If the coil area of any turn of coil in the first group of coils 301 is S1, the coil area of any turn of coil in the second group of coils 302 is S2, and the coil area of any turn of coil in the third group of coils 303 is S3, the following formula needs to be met $$N \times \frac{\Delta \int_{S1} Bds}{\Delta t} + N \times \frac{\Delta \int_{S3} Bds}{\Delta t} = N \times \frac{\Delta \int_{S2} Bds}{\Delta t}.$$

After same parameters are removed, the foregoing formula may be transformed to $$\Delta \int_{S1} Bds + \Delta \int_{S3} Bds = \Delta \int_{S2} Bds,$$

where $$\Delta \int_{S1} Bds$$

is the variation of the magnetic flux of any turn of coil in the first group of coils 301 in the first magnetic field, B is the magnetic induction intensity of the first magnetic field in an area ds, $$\Delta \int_{S2} Bds$$

is the variation of the magnetic flux of any turn of coil in the second group of coils 302 in the first magnetic field, and $$\Delta \int_{S3} Bds$$

is the variation of the magnetic flux of any turn of coil in the third group of coils 303 in the first magnetic field.

In the foregoing formula, how to specifically adjust the coil area of any turn of coil in the three groups of coils can be determined, to implement that the sum of the induced electromotive forces generated by the groups of coils in the first magnetic field is zero, and further improve detection accuracy and detection efficiency of the detection coil.

(2). Adjust the quantity of coil turns of each group of coils and the coil area of each turn of coil, and change the winding direction of each turn of coil.

When the quantities of coil turns of the groups of coils are different, a quantity of coil turns of the first group of coils 301 is N1, a quantity of coil turns of the second group of coils 302 is N2, and a quantity of coil turns of the third group of coils 303 is N3. Herein, N1, N2, and N3 are all positive integers greater than or equal to 1, N2 is greater than N1, and N2 is greater than N3. The induced electromotive force $E_1$ generated by the first group of coils 301 in the first magnetic field is $$N1 \times \frac{\Delta \varphi_1}{\Delta t},$$

where $\Delta \varphi_1$ is the variation of the magnetic flux of any turn of coil in the first group of coils 301 in the first magnetic field in the time period $\Delta t$. The induced electromotive force $E_2$ generated by the second group of coils 302 in the first magnetic field is $$N2 \times \frac{\Delta \varphi_2}{\Delta t},$$

where $\Delta \varphi_2$ is the variation of the magnetic flux of any turn of coil in the second group of coils 302 in the first magnetic field in the time period $\Delta t$. The induced electromotive force $E_3$ generated by the third group of coils 303 in the first magnetic field is $$N3 \times \frac{\Delta \varphi_3}{\Delta t},$$

where $\Delta \varphi_3$ is the variation of the magnetic flux of any turn of coil in the third group of coils 303 in the first magnetic field in the time period $\Delta t$.

In other words, the induced electromotive force generated by each group of coils in the first magnetic field meets the following formula $$N1 \times \frac{\Delta\varphi_1}{\Delta t} + N3 \times \frac{\Delta\varphi_3}{\Delta t} = N2 \times \frac{\Delta\varphi_2}{\Delta t}.$$

After a same parameter is removed, the foregoing formula may be transformed to $$N1 \times \Delta\varphi_1 + N3 \times \Delta\varphi_3 = N2 \times \Delta\varphi_2.$$

For the winding direction of each group of coils, refer to related descriptions in manner (1). Details are not described herein again.

The quantities of coil turns and the coil area of each turn of coil in the first group of coils 301, the second group of coils 302, and the third group of coils 303 may be flexibly adjusted, to implement that the sum of the induced electromotive forces of the first group of coils 301, the second group of coils 302, and the third group of coils 303 in the first magnetic field is zero. The three groups of coils of the detection coil may be formed in a plurality of manners, to be applied to different detection scenarios.

In this embodiment of this disclosure, magnetic flux calculation performed when the first magnetic field is the uniform magnetic field is different from magnetic flux calculation performed when the first magnetic field is the non-uniform magnetic field. The following separately describes the two cases.

(1) The first magnetic field is the uniform magnetic field, and magnetic induction intensities B at points in the first magnetic field are the same.

If the coil area of any turn of coil in the first group of coils 301 is S1, the coil area of any turn of coil in the second group of coils 302 is S2, and the coil area of any turn of coil in the third group of coils 303 is S3, the following formula needs to be met $$N1 \times \frac{\Delta B \times S1}{\Delta t} + N3 \times \frac{\Delta B \times S3}{\Delta t} = N2 \times \frac{\Delta B \times S2}{\Delta t}.$$

After same parameters are removed, the foregoing formula is transformed to $$N1 \times \Delta B \times S1 + N3 \times \Delta B \times S3 = N2 \times \Delta B \times S2,$$

where $\Delta B$ is a variation of a magnetic induction intensity of the first magnetic field in the time period $\Delta t$.

It should be noted that the foregoing formula is also applicable when the magnetic induction intensities B at points in a region surrounded by the third group of coils 303 are within an error allowed range and may be considered to be approximately the same.

(2) The first magnetic field is the non-uniform magnetic field, and the magnetic induction intensities B at points in the first magnetic field are not necessarily the same.

If the coil area of any turn of coil in the first group of coils 301 is S1, the coil area of any turn of coil in the second group of coils 302 is S2, and the coil area of any turn of coil in the third group of coils 303 is S3, the following formula needs to be met $$N1 \times \frac{\Delta \int_{S1} Bds}{\Delta t} + N3 \times \frac{\Delta \int_{S3} Bds}{\Delta t} = N2 \times \frac{\Delta \int_{S2} Bds}{\Delta t}.$$

After a same parameter is removed, the foregoing formula may be transformed to $$N1 \times \Delta \int_{S1} Bds + N3 \times \Delta \int_{S3} Bds = N2 \times \Delta \int_{S2} Bds,$$

where $$\Delta \int_{S1} Bds$$

is the variation of the magnetic flux of any turn of coil in the first group of coils 301 in the first magnetic field, B is the magnetic induction intensity of the first magnetic field in an area ds, $$\Delta \int_{S2} Bds$$

is the variation of the magnetic flux of any turn of coil in the second group of coils 302 in the first magnetic field, and $$\Delta \int_{S3} Bds$$

is the variation of the magnetic flux of any turn of coil in the third group of coils 303 in the first magnetic field.

It should be noted that, the case (1) is a special case of the case (2). In the case (2), when B is a same value, a formula in the case (1) may be obtained.

Using the formulas in the foregoing two cases, how to specifically adjust the quantities of coil turns of the three groups of coils and the coil area of each turn of coil can be determined, to effectively improve detection accuracy of the detection coil.

The following describes an implementation of adjusting a quantity of coil turns of each group of coils and a coil area of each turn of coil and changing a winding direction of each coil using two specific embodiments.

Figure 4:
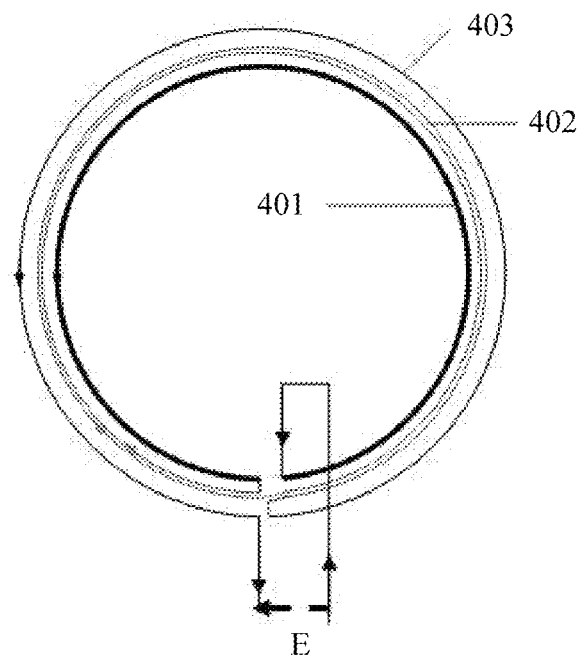
FIG. 4 is a schematic structural diagram of a detection coil according to this disclosure.

Embodiment 1. FIG. 4 shows a detection coil according to an embodiment of this disclosure. The detection coil includes a first group of coils 401, a second group of coils 402, and a third group of coils 403 that are continuously wound and coaxial. In an embodiment, the first group of coils 401, the second group of coils 402, and the third group of coils 403 are connected in series, quantities of coil turns of the first group of coils 401 and the third group of coils 403 are both 1, and a quantity of coil turns of the second group of coils 402 is 2. For winding directions of the three groups of coils (to distinguish between different coils, the first group of coils 401 and the third group of coils 403 are represented using black lines, and the second group of coils 402 is represented using gray lines), it may be learned that, a reverse winding manner is used at one end of the first group of coils 401, and winding is performed for two circles to form the second group of coils 402, and then, the reverse winding manner is used again, and winding is performed for one circle to form the third group of coils 403.

For relative directions of induced currents in the first group of coils 401, the second group of coils 402, and the third group of coils 403, refer to arrows on coils in FIG. 4. For example, directions of the induced currents in the first group of coils 401 and the third group of coils 403 are a counterclockwise direction, and a direction of the induced current in the second group of coils 402 is a clockwise direction.

Figure 5:
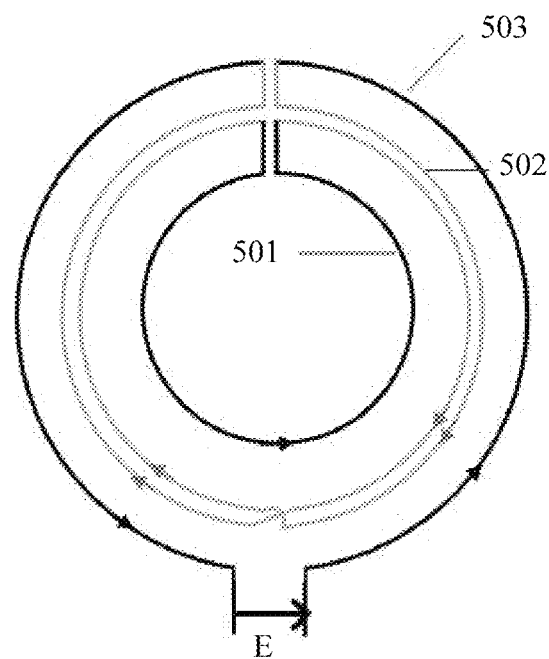
FIG. 5 is a schematic structural diagram of a detection coil according to this disclosure.

Embodiment 2. FIG. 5 shows a detection coil according to an embodiment of this disclosure. The detection coil includes a first group of coils 501, a second group of coils 502, and a third group of coils 503 that are continuously wound and coaxial. Quantities of coil turns of the first group of coils 501 and the third group of coils 503 are both 1, and a quantity of coil turns of the second group of coils 502 is 2. For winding directions of the three groups of coils (to distinguish between different coils, the first group of coils 501 and the third group of coils 503 are represented using black lines, and the second group of coils 502 is represented using gray lines), it may be learned that a reverse winding manner is used at one end of the third group of coils 503, and winding is performed for one circle to form one turn of coil in the second group of coils 502, the reverse winding manner is used again, and winding is performed for one circle to form the first group of coils 501, and then, the reverse winding manner is used again, and winding is performed for one circle to form another turn of coil in the second group of coils 502.

For relative directions of induced currents in the first group of coils 501, the second group of coils 502, and the third group of coils 503, refer to arrows on coils in FIG. 5. For example, directions of the induced currents in the first group of coils 501 and the third group of coils 503 are a clockwise direction, and a direction of the induced current in the second group of coils 502 is a counterclockwise direction.

It should be noted that, for ease of distinguishing between winding directions of groups of coils and between sizes of groups of coils, a quantity of coil turns of each group of coils in FIG. 4 and FIG. 5 is relatively small. Actually, a quantity of coil turns of each group of coils may be set according to a specific disclosure scenario. This is not limited in this embodiment of this disclosure. FIG. 4 and FIG. 5 show merely relative directions of the induced currents. In actual disclosure, the direction of the induced current in each group of coils is related to a direction of the magnetic field generated by the transmit coil and a change status of the magnetic field.

Figure 6:
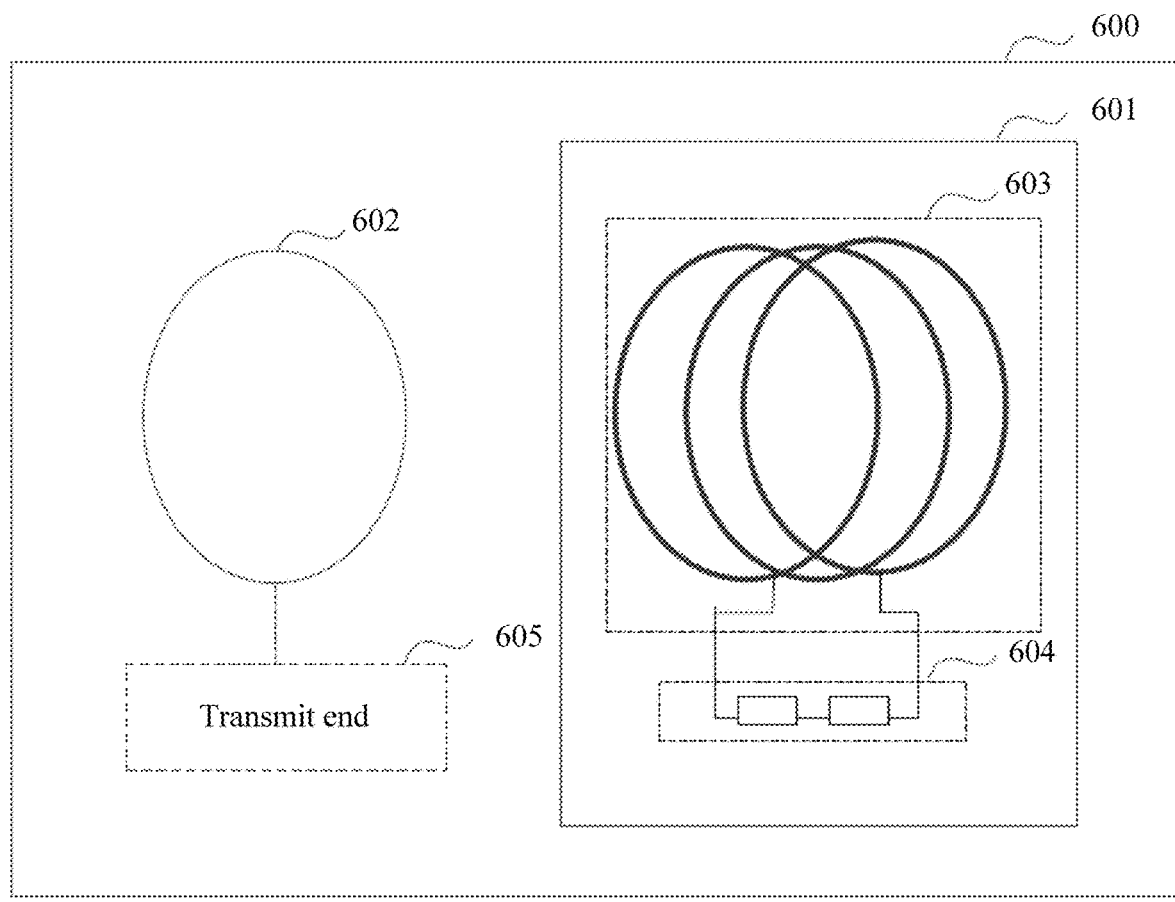
FIG. 6 is a schematic structural diagram of another detection system according to this disclosure.

To efficiently detect a metal foreign matter around the transmit coil, an embodiment of this disclosure provides a detection system. FIG. 6 is a schematic structural diagram of a detection system according to an embodiment of this disclosure. The detection system 200 includes a detection apparatus 601 and a transmit coil 602.

The detection apparatus 601 includes a plurality of groups of coils 603 that are continuously wound and coaxial and a plurality of voltage divider resistors 604, and the plurality of groups of coils 603 in the detection apparatus 601 are centrally symmetrical to the transmit coil 602. In other words, the plurality of groups of coils 603 and the transmit coil 602 may be disposed in parallel. The plurality of groups of coils 603 and the transmit coil 602 are disposed in parallel such that a magnetic field generated by the transmit coil 602 can be symmetrical in a region surrounded by the plurality of groups of coils. If a metal foreign matter exists, the magnetic field is asymmetrical in the region surrounded by the plurality of groups of coils. The magnetic fields in the region surrounded by the plurality of groups of coils include the magnetic field generated by the transmit coil 602 and a magnetic field generated by the metal foreign matter.

The detection system 600 may further include a transmit end 605, and the transmit end 605 is connected to the transmit coil 602, to supply electrical energy to the transmit coil 602.

The following describes a detection apparatus that may be applied to the detection system shown in FIG. 6 such that the detection coil can be applied to a scenario in which wireless power transfer is performed using the transmit coil.

Figure 7:
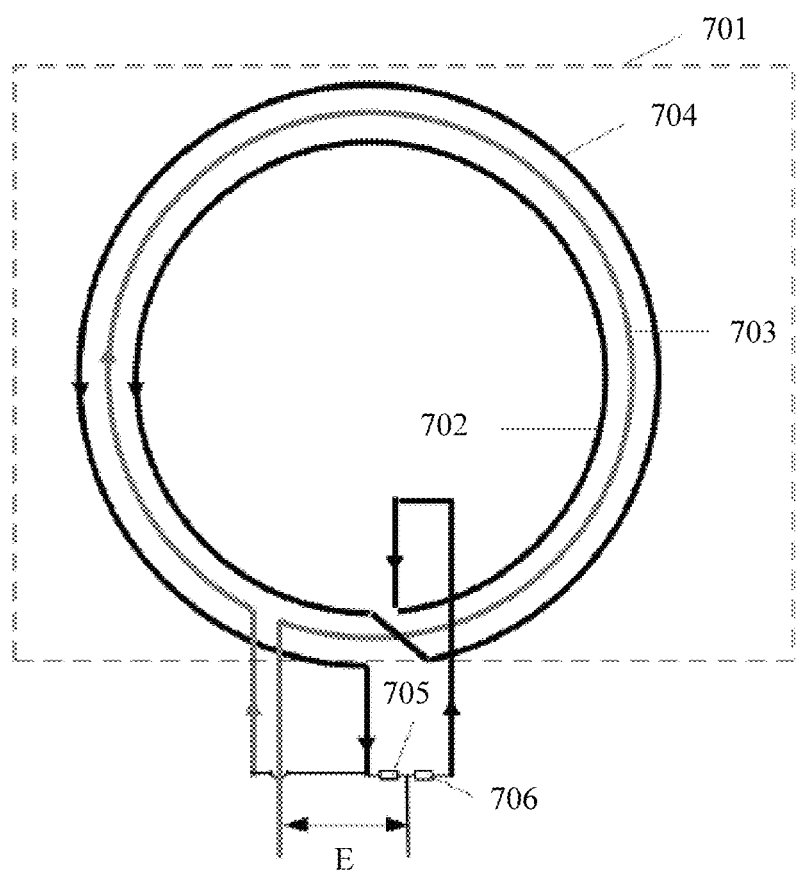
FIG. 7 is a schematic structural diagram of a detection apparatus according to this disclosure.

As shown in FIG. 7, an embodiment of this disclosure provides a detection apparatus, and the detection apparatus includes a detection coil 701.

The detection coil is a planar coil, and includes a first group of coils 702, a second group of coils 703, and a third group of coils 704 that are continuously wound and coaxial, and the second group of coils is located between the first group of coils and the third group of coils.

The first group of coils 702, the second group of coils 703, and the third group of coils 704 each include at least one turn of continuously wound coil. When the first group of coils 702, the second group of coils 703, or the third group of coils 704 includes a continuously wound multi-turn coil, the continuously wound multi-turn coil is coaxial.

Based on a location relationship of the three groups of coils, it may be learned that a coil area of any turn of coil in the third group of coils 704 is greater than a coil area of any turn of coil in the second group of coils 703, and the coil area of any turn of coil in the second group of coils 703 is greater than a coil area of any turn of coil in the first group of coils 702.

For a description of the planar coil, refer to the embodiment shown in FIG. 3. Details are not described herein again.

The detection apparatus further includes a first voltage divider resistor 705 and a second voltage divider resistor 706. One end of the first voltage divider resistor 705 is connected to one end of the first group of coils 702, and the other end of the first voltage divider resistor 705 is connected to one end of the second voltage divider resistor 706. The other end of the second voltage divider resistor 706 is connected to one end of the third group of coils 704.

When the detection apparatus is disposed in a first magnetic field, a voltage at two ends of the first voltage divider resistor 705 is equal to a value of an induced electromotive force generated by the second group of coils 703 in the first magnetic field, and a direction of the voltage of at two ends of the first voltage divider resistor 705 is opposite to a direction of the induced electromotive force generated by the second group of coils 703 in the first magnetic field.

A location relationship among a coil used to generate the first magnetic field and the three groups of coils meets the following condition. The coil that generates the first magnetic field is coaxial with the first group of coils 702, the second group of coils 703, and the third group of coils 704. In other words, an axis on which centers of the first group of coils 702, the second group of coils 703, and the third group of coils 704 are located overlaps an axis on which a center of the coil used to generate the first magnetic field is located.

When a current passes through the coil used to generate the first magnetic field, the first magnetic field is generated around the coil, and induced electromotive forces are generated by the first group of coils 702, the second group of coils 703, and the third group of coils 704 in the first magnetic field.

Because the first group of coils 702 and the third group of coils 704 are connected in series, the first voltage divider resistor 705 and the second voltage divider resistor 706 are respectively connected to two ends of the first group of coils 702 and the third group of coils 704. The first voltage divider resistor 705 and the second voltage divider resistor 706 have a voltage division effect on induced electromotive forces generated by the first group of coils 702 and the third group of coils 704 in the first magnetic field. In other words, a voltage drop exists on the first voltage divider resistor 705 and the second voltage divider resistor 706.

If resistance values of the first group of coils 702 and the third group of coils 704 are ignored, a total voltage of the first voltage divider resistor 705 and the second voltage divider resistor 706 is equal to the sum of induced electromotive forces generated by the first group of coils 702 and the third group of coils 704 in the first magnetic field. The voltage at the two ends of the first voltage divider resistor 705 and a voltage at two ends of the second voltage divider resistor 706 meet a voltage division law. Directions of the voltage at the two ends of the first voltage divider resistor 705 and the voltage at the two ends of the second voltage divider resistor 706 are defined to be the same as directions of the induced electromotive forces generated by the first group of coils 702 and the third group of coils 704 in the first magnetic field.

When the induced electromotive force generated by the first group of coils 702 in the first magnetic field is $E_1$, the induced electromotive force generated by the second group of coils 703 in the first magnetic field is $E_2$, the induced electromotive force generated by the third group of coils 704 in the first magnetic field is $E_3$, a resistance value of the first voltage divider resistor 705 is R1, and a resistance value of the second voltage divider resistor 706 is R2, the voltage at the two ends of the first voltage divider resistor 705 is equal to $$(E_1 + E_3) \times \frac{R1}{R1 + R2}.$$

The voltage at the two ends of the first voltage divider resistor 705 and $E_2$ meet the following relationship $$(E_1 + E_3) \times \frac{R1}{R1 + R2 + R} = E_2.$$

If the resistance values of the first group of coils 702 and the third group of coils 704 cannot be ignored, when a sum of the resistance values of the first group of coils 702 and the third group of coils 704 is R, the voltage at the two ends of the first voltage divider resistor 705 is equal to $$(E_1 + E_3) \times \frac{R1}{R1 + R2 + R}.$$

The voltage at the two ends of the first voltage divider resistor 705 and $E_2$ meet the following relationship $$(E_1 + E_3) \times \frac{R1}{R1 + R2 + R} = E_2.$$

For each group of coils, an induced electromotive force of each group of coils is related to a quantity of turns of each group of coils and a change rate of a magnetic flux passing through any turn of each group of coils. The magnetic flux is related to a magnetic induction intensity of the first magnetic field and a coil area of any turn of coil.

When the detection apparatus shown in FIG. 7 is applied to the detection system shown in FIG. 6, the transmit coil is centrally symmetrical to the first group of coils 702, the second group of coils 703, and the third group of coils 704. In other words, the transmit coil is coaxial with the first group of coils 702, the second group of coils 703, and the third group of coils 704. A sum of the voltage at the two ends of the first voltage divider resistor 705 in the detection apparatus and the induced electromotive force generated by the second group of coils 703 in the first magnetic field is zero, and the coil that generates the first magnetic field is coaxial with the three groups of coils. Therefore, when a current passes through the transmit coil, a magnetic field is generated around the transmit coil. A case in which the magnetic field generated around the transmit coil exits is similar to a case in which the first magnetic field exists. When the detection apparatus is located in the magnetic field generated by the transmit coil, a sum of the voltage at the two ends of the first voltage divider resistor 705 and an induced electromotive force generated by the second group of coils 703 in the magnetic field generated by the transmit coil is also zero.

When a metal foreign matter exists, a magnetic field generated by the metal foreign matter affects the induced electromotive forces of the first group of coils 702, the second group of coils 703, and the third group of coils 704, and upsets a balance state in which the sum of the voltage of the first voltage divider resistor 705 and the induced electromotive force of the second group of coils 703 is equal to zero. An induced electromotive force of the second group of coils 703 includes the induced electromotive force generated by the second group of coils 703 in the first magnetic field and an induced electromotive force generated by the second group of coils 703 in the magnetic field generated by the metal foreign matter. The sum of the voltage of the first voltage divider resistor 705 and the induced electromotive force of the second group of coils 703 is not zero, to accurately and conveniently determine that the metal foreign matter exists.

For related descriptions of the magnetic field generated by the transmit coil and the coil used to generate the first magnetic field, refer to descriptions in the embodiment shown in FIG. 3. Details are not described herein again.

To implement that the voltage at the two ends of the first voltage divider resistor 705 is equal to the value of the induced electromotive force generated by the second group of coils 703 in the magnetic field, and the direction of the voltage of at two ends of the first voltage divider resistor 705 is opposite to the direction of the induced electromotive force generated by the second group of coils 703 in the first magnetic field, a quantity of coil turns of each group of coils and a coil area of each turn of coil may be adjusted, and a winding direction of each turn of coil may be changed. The following uses an example in which a variation of a magnetic flux of any turn of coil in each group of coils in the first magnetic field is used to calculate an induced electromotive force of each group of coils for description.

(1) Adjust the coil area of each turn of coil, and change the winding direction of each turn of coil.

When quantities of coil turns of each group of coils are the same and are all equal to N, the induced electromotive force $E_1$ generated by the first group of coils 702 in the first magnetic field is $$N \times \frac{\Delta \varphi_1}{\Delta t},$$

where $\Delta \varphi_1$ is a variation of a magnetic flux of any turn of coil in the first group of coils 702 in the first magnetic field in a time period $\Delta t$, the induced electromotive force $E_2$ generated by the second group of coils 703 in the first magnetic field is $$N \times \frac{\Delta \varphi_2}{\Delta t},$$

where $\Delta \varphi_2$ is a variation of a magnetic flux of any turn of coil in the second group of coils 703 in the first magnetic field in the time period $\Delta t$, the induced electromotive force $E_3$ generated by the third group of coils 704 in the first magnetic field is $$N \times \frac{\Delta \varphi_3}{\Delta t},$$

where $\Delta \varphi_3$ is a variation of a magnetic flux of any turn of coil in the third group of coils 704 in the first magnetic field in the time period $\Delta t$.

In other words, the induced electromotive force generated by each group of coils in the first magnetic field meets the following formula $$\left(N \times \frac{\Delta \varphi_1}{\Delta t} + N \times \frac{\Delta \varphi_3}{\Delta t}\right) \times \frac{R1}{R1+R2} = N \times \frac{\Delta \varphi_2}{\Delta t}, \text{ or}$$

$$\left(N \times \frac{\Delta \varphi_1}{\Delta t} + N \times \frac{\Delta \varphi_3}{\Delta t}\right) \times \frac{R1}{R1+R2+R} = N \times \frac{\Delta \varphi_2}{\Delta t}.$$

After same parameters are removed, the foregoing formula may be transformed to $$(\Delta \varphi_1 + \Delta \varphi_3) \times \frac{R1}{R1+R2} = \Delta \varphi_2, \text{ or}$$

$$(\Delta \varphi_1 + \Delta \varphi_3) \times \frac{R1}{R1+R2+R} = \Delta \varphi_2.$$

In order that the direction of the induced electromotive force generated by the second group of coils 703 in the first magnetic field is opposite to a direction of the voltage at the two ends of the first voltage divider resistor 705, a winding direction of each turn of coil in the second group of coils 703 may be opposite to a winding direction of each turn of coil in the first group of coils 702. The winding direction of each turn of coil in the second group of coils 703 may be opposite to a winding direction of each turn of coil in the third group of coils 704. The winding direction of the coil in this embodiment of this disclosure may be determined based on the winding direction of the coil along the axis. For example, the winding direction is counterclockwise or clockwise. Alternatively, the winding direction of the coil may be determined based on a direction of an induced current in the coil. If a direction of an induced current in the second group of coils 703 is opposite to a direction of an induced current in the first group of coils 702, it indicates that the winding directions of the coils are the same, otherwise, it indicates that the winding directions of the coils are the same.

Any manner in which the induced electromotive force generated by the second group of coils 703 in the first magnetic field is opposite to the voltage direction at the two ends of the first voltage divider resistor 705 is applicable to this embodiment of this disclosure.

In this embodiment of this disclosure, magnetic flux calculation performed when the first magnetic field is a uniform magnetic field is different from magnetic flux calculation performed when the first magnetic field is a non-uniform magnetic field. The following separately describes the two cases.

(1) The first magnetic field is the uniform magnetic field, and magnetic induction intensities B at points in the first magnetic field are the same.

If the coil area of any turn of coil in the first group of coils 702 is S1, the coil area of any turn of coil in the second group of coils 703 is S2, and the coil area of any turn of coil in the third group of coils 704 is S3, the following formula needs to be met $$\left(N \times \frac{\Delta B \times S1}{\Delta t} + N \times \frac{\Delta B \times S3}{\Delta t}\right) \times \frac{R1}{R1+R2} = N \times \frac{\Delta B \times S2}{\Delta t}, \text{ or}$$

$$\left(N \times \frac{\Delta B \times S1}{\Delta t} + N \times \frac{\Delta B \times S3}{\Delta t}\right) \times \frac{R1}{R1+R2+R} = N \times \frac{\Delta B \times S2}{\Delta t}.$$

After same parameters are removed, the foregoing formula may be transformed to $$(\Delta B \times S1 + \Delta B \times S3) \times \frac{R1}{R1+R2} = \Delta B \times S2, \text{ or}$$

$$(\Delta B \times S1 + \Delta B \times S3) \times \frac{R1}{R1+R2+R} = \Delta B \times S2,$$

where $\Delta B$ is a variation of a magnetic induction intensity of the first magnetic field in the time period $\Delta t$.

It should be noted that the foregoing formula is also applicable when the magnetic induction intensities B at points in a region surrounded by the first group of coils 702 and the third group of coils 704 are within an error allowed range and may be considered to be approximately the same.

(2) The first magnetic field is the non-uniform magnetic field, and the magnetic induction intensities B at points in the first magnetic field are different.

If the coil area of any turn of coil in the first group of coils 702 is S1, the coil area of any turn of coil in the second group of coils 703 is S2, and the coil area of any turn of coil in the third group of coils 704 is S3, the following formula needs to be met $$\left(N \times \frac{\Delta \int_{S1} Bds}{\Delta t} + N \times \frac{\Delta \int_{S3} Bds}{\Delta t}\right) \times \frac{R1}{R1+R2} = N \times \frac{\Delta \int_{S2} Bds}{\Delta t}, \text{ or}$$

$$\left(N \times \frac{\Delta \int_{S1} Bds}{\Delta t} + N \times \frac{\Delta \int_{S3} Bds}{\Delta t}\right) \times \frac{R1}{R1+R2+R} = N \times \frac{\Delta \int_{S2} Bds}{\Delta t}.$$

After same parameters are removed, the foregoing formula may be transformed to $$\left(\Delta \int_{S1} Bds + \Delta \int_{S3} Bds\right) \frac{R1}{R1+R2} = \Delta \int_{S2} Bds, \text{ or}$$

$$\left(\Delta \int_{S1} Bds + \Delta \int_{S3} Bds\right) \frac{R1}{R1+R2+R} = \Delta \int_{S2} Bds,$$

where $$\Delta \int_{S1} Bds$$

is the variation of the magnetic flux of any turn of coil in the first group of coils 702 in the first magnetic field, B is the magnetic induction intensity of the first magnetic field in an area ds, $$\Delta \int_{S2} Bds$$

is the variation of the magnetic flux of any turn of coil in the second group of coils 703 in the first magnetic field, and $$\Delta \int_{S3} Bds$$

is the variation of the magnetic flux of any turn of coil in the third group of coils 704 in the first magnetic field.

It should be noted that, the case (1) is a special case of the case (2). In the case (2), when B is a same value, a formula in the case (1) may be obtained.

Using the formulas in the foregoing two cases, how to specifically adjust the coil area of each turn of coil in the three groups of coils can be determined, to improve detection accuracy and detection efficiency of the detection apparatus.

(2). Adjust the quantity of turns of each group of coils and the coil area of each turn of coil, and change the winding direction of each turn of coil.

When the quantities of coil turns of the groups of coils are different, a quantity of coil turns of the first group of coils 702 is N1, a quantity of coil turns of the second group of coils 703 is N2, and a quantity of coil turns of the third group of coils 704 is N3. Herein, N1, N2, and N3 are all positive integers greater than or equal to 1. The induced electromotive force $E_1$ generated by the first group of coils 702 in the first magnetic field is $$N1 \times \frac{\Delta \varphi_1}{\Delta t},$$

where $\Delta \varphi_1$ is the variation of the magnetic flux of any turn of coil in the first group of coils 702 in the first magnetic field in the time period $\Delta t$. The induced electromotive force $E_2$ generated by the second group of coils 703 in the first magnetic field is $$N2 \times \frac{\Delta \varphi_2}{\Delta t},$$

where $\Delta \varphi_2$ is the variation of the magnetic flux of any turn of coil in the second group of coils 703 in the first magnetic field in the time period $\Delta t$. The induced electromotive force $E_3$ generated by the third group of coils 704 in the first magnetic field is $$N3 \times \frac{\Delta \varphi_3}{\Delta t},$$

where $\Delta \varphi_3$ is the variation of the magnetic flux of any turn of coil in the third group of coils 704 in the first magnetic field in the time period $\Delta t$.

In other words, the induced electromotive force generated by each group of coils in the first magnetic field meets the following formula $$\left(N1 \times \frac{\Delta \varphi_1}{\Delta t} + N3 \times \frac{\Delta \varphi_3}{\Delta t}\right) \times \frac{R1}{R1+R2} = N2 \times \frac{\Delta \varphi_2}{\Delta t}, \text{ or}$$

$$\left(N1 \times \frac{\Delta \varphi_1}{\Delta t} + N3 \times \frac{\Delta \varphi_3}{\Delta t}\right) \times \frac{R1}{R1+R2+R} = N2 \times \frac{\Delta \varphi_2}{\Delta t}.$$

After a same parameter is removed, the foregoing formula may be transformed to $$(N1 \times \Delta \varphi_1 + N3 \times \Delta \varphi_3) \times \frac{R1}{R1+R2} = N2 \times \Delta \varphi_2, \text{ or}$$

$$(N1 \times \Delta \varphi_1 + N3 \times \Delta \varphi_3) \times \frac{R1}{R1+R2+R} = N2 \times \Delta \varphi_2.$$

In this embodiment of this disclosure, magnetic flux calculation performed when the first magnetic field is the uniform magnetic field is different from magnetic flux calculation performed when the first magnetic field is the non-uniform magnetic field. The following separately describes the two cases. Two cases are performed to calculate.

(1) The first magnetic field is the uniform magnetic field, and magnetic induction intensities B at points in the first magnetic field are the same.

If the coil area of any turn of coil in the first group of coils 702 is S1, the coil area of any turn of coil in the second group of coils 703 is S2, and the coil area of any turn of coil in the third group of coils 704 is S3, the following formula needs to be met $$\left(N1 \times \frac{\Delta B \times S1}{\Delta f} + N3 \times \frac{\Delta B \times S3}{\Delta f}\right) \times \frac{R1}{R1+R2} = N2 \times \frac{\Delta B \times S2}{\Delta f}, \text{ or}$$

$$\left(N1 \times \frac{\Delta B \times S1}{\Delta f} + N3 \times \frac{\Delta B \times S3}{\Delta f}\right) \times \frac{R1}{R1+R2+R} = N2 \times \frac{\Delta B \times S2}{\Delta f}.$$

After a same parameter is removed, the foregoing formula may be transformed to $$(N1 \times \Delta B \times S1 + N3 \times \Delta B \times S3) \times \frac{R1}{R1+R2} = N2 \times \Delta B \times S2, \text{ or}$$

$$(N1 \times \Delta B \times S1 + N3 \times \Delta B \times S3) \times \frac{R1}{R1+R2+R} = N2 \times \Delta B \times S2,$$

where $\Delta B$ is a variation of a magnetic induction intensity of the first magnetic field in the time period $\Delta t$.

It should be noted that the foregoing formula is also applicable when the magnetic induction intensities B at points in a region surrounded by the first group of coils 702 and the third group of coils 704 are within an error allowed range and may be considered to be approximately the same.

(2) The first magnetic field is the non-uniform magnetic field, and the magnetic induction intensities B at points in the first magnetic field are different.

If the coil area of any turn of coil in the first group of coils 702 is S1, the coil area of any turn of coil in the second group of coils 703 is S2, and the coil area of any turn of coil in the third group of coils 704 is S3, the following formula needs to be met $$\left(N1 \times \frac{\Delta \int_{S1} Bds}{\Delta t} + N3 \times \frac{\Delta \int_{S3} Bds}{\Delta t}\right) \times \frac{R1}{R1+R2} = N2 \times \frac{\Delta \int_{S2} Bds}{\Delta t}, \text{ or}$$

$$\left(N1 \times \frac{\Delta \int_{S1} Bds}{\Delta t} + N3 \times \frac{\Delta \int_{S3} Bds}{\Delta t}\right) \times \frac{R1}{R1+R2+R} = N2 \times \frac{\Delta \int_{S2} Bds}{\Delta t}.$$

After a same parameter is removed, the foregoing formula may be transformed to $$\left(N1 \times \Delta \int_{S1} Bds + N3 \times \Delta \int_{S3} Bds\right) \times \frac{R1}{R1+R2} = N2 \times \Delta \int_{S2} Bds, \text{ or}$$

$$\left(N1 \times \Delta \int_{S1} Bds + N3 \times \Delta \int_{S3} Bds\right) \times \frac{R1}{R1+R2+R} = N2 \times \Delta \int_{S2} Bds,$$

where $$\Delta \int_{S1} Bds$$

is the variation of the magnetic flux of any turn of coil in the first group of coils 702 in the first magnetic field, B is the magnetic induction intensity of the first magnetic field in an area ds, $$\Delta \int_{S2} Bds$$

is the variation of the magnetic flux of any coil in the second group of coils 703 in the first magnetic field, and $$\Delta \int_{S3} Bds$$

is the variation of the magnetic flux of any turn of coil in the third group of coils 704 in the first magnetic field.

It should be noted that, the case (1) is a special case of the case (2). In the case (2), when B is a same value, a formula in the case (1) may be obtained.

Using the formulas in the foregoing two cases, how to specifically adjust the quantities of coil turns of the three groups of coils and the coil area of each turn of coil can be determined, to further ensure high detection accuracy and high detection efficiency of the detection apparatus.

The following describes an implementation of adjusting an area and a quantity of turns of each coil and changing a winding direction of each coil using a specific embodiment.

Embodiment 1. With reference to FIG. 7, quantities of coil turns of the first group of coils 702, the third group of coils 704, and the second group of coils 703 are all 1. Sizes of the first group of coils 702, the third group of coils 704, and the second group of coils 703 are set such that the induced electromotive force generated by the first group of coils 702 in the first magnetic field is E1, the induced electromotive force generated by the second group of coils 703 in the first magnetic field is E2, and the induced electromotive force generated by the third group of coils 704 in the first magnetic field is E3 meet $E_1+E_3=2E_2$.

Resistance values of the first voltage divider resistor 705 and the second voltage divider resistor 706 are the same, and the voltage at the two ends of the first voltage divider resistor 705 is a half of the induced electromotive forces generated by the first group of coils 702 and the third group of coils 704 in the magnetic field generated by the transmit coil, namely, ½ (E1+E3).

In this case, the voltage at the two ends of the first voltage divider resistor 705 is equal to a value of the induced electromotive force generated by the second group of coils 703 in the first magnetic field, and the direction of the voltage of at two ends of the first voltage divider resistor is opposite to the direction of the induced electromotive force generated by the second group of coils in the first magnetic field.

In a case in which the detection coil shown in FIG. 3 detects the metal foreign matter, when the metal foreign matter is located in an annular region surrounded by the first group of coils 301 and the third group of coils 303 in the detection apparatus, because the eddy current is generated in the metal foreign matter in the magnetic field generated by the transmit coil, the eddy current in the metal foreign matter excites a magnetic field, and the three groups of coils in the detection coil also generate an induced electromotive force in the magnetic field excited by the eddy current. In addition, because a shape of the magnetic field excited by the eddy current in the metal foreign matter is asymmetrical to the three groups of coils in the detection apparatus, a sum of the induced electromotive forces generated by the three groups of coils in the magnetic field excited by the eddy current is not zero. When a controller in the detection apparatus determines that the sum of the induced electromotive forces of the three groups of coils in the detection apparatus is not zero, it may be determined that the foreign matter exists.

For the detection apparatus shown in FIG. 7, when the metal foreign matter is located in an annular region surrounded by the first group of coils 702 and the third group of coils 704 in the detection apparatus, when it is determined that the sum of the voltage at the two ends of the first voltage divider resistor 705 and the induced electromotive force of the second group of coils 703 is not zero, it may be determined that the foreign matter exists.

When an area of the metal foreign matter is relatively large, a blind spot region is likely to exist for the foregoing mentioned detection apparatus or detection coil. The blind spot region is a region in which the metal foreign matter is located when the sum of the induced electromotive forces of the first group of coils, the second group of coils, and the third group of coils in the magnetic field generated by the eddy current in the metal foreign matter is zero.

The detection coil shown in FIG. 4 is used as an example to describe the blind spot region of the detection apparatus. If the metal foreign matter crosses the second group of coils 402, and the metal foreign matter is evenly divided into two parts by the second group of coils 402, one part is located between the first group of coils 401 and the second group of coils 402, and the other part is located between the third group of coils 403 and the second group of coils 402. An induced electromotive force is not generated in the first group of coils 401 in the magnetic field generated by the eddy current in the metal foreign matter. An induced electromotive force generated in the second group of coils 402 in the magnetic field generated by the eddy current in the metal foreign matter is essentially generated due to the magnetic field generated by the eddy current in a half of the metal foreign matter. The induced electromotive force generated in the first group of coils 401 in the magnetic field generated by the eddy current in the metal foreign matter is essentially generated by the eddy current in the entire metal foreign matter. In addition, the quantity of coil turns of the second group of coils 402 is twice the quantity of coil turns of the first group of coils 401. Therefore, $2E_2=E_3$. In this case, a voltage at two ends of the detection coil is still zero, and the metal foreign matter cannot be detected. In other words, a location of the metal foreign matter is the blind spot region It should be understood that the foregoing description is description made merely for ease of understanding the blind spot region. In actual disclosure, because the magnetic field generated by the metal foreign matter is not necessarily uniform, calculation of the induced electromotive forces generated by the third group of coils and the first group of coils in the magnetic field generated by the metal foreign matter is more complex. However, for the blind spot region, it may be determined that, the blind spot region is more likely to exist when the metal foreign matter crosses the second group of coils and is divided into two parts by the second group of coils.

The following describes two detection apparatuses that are applied to the detection system shown in FIG. 6, to implement blind spot detection.

Figure 8:
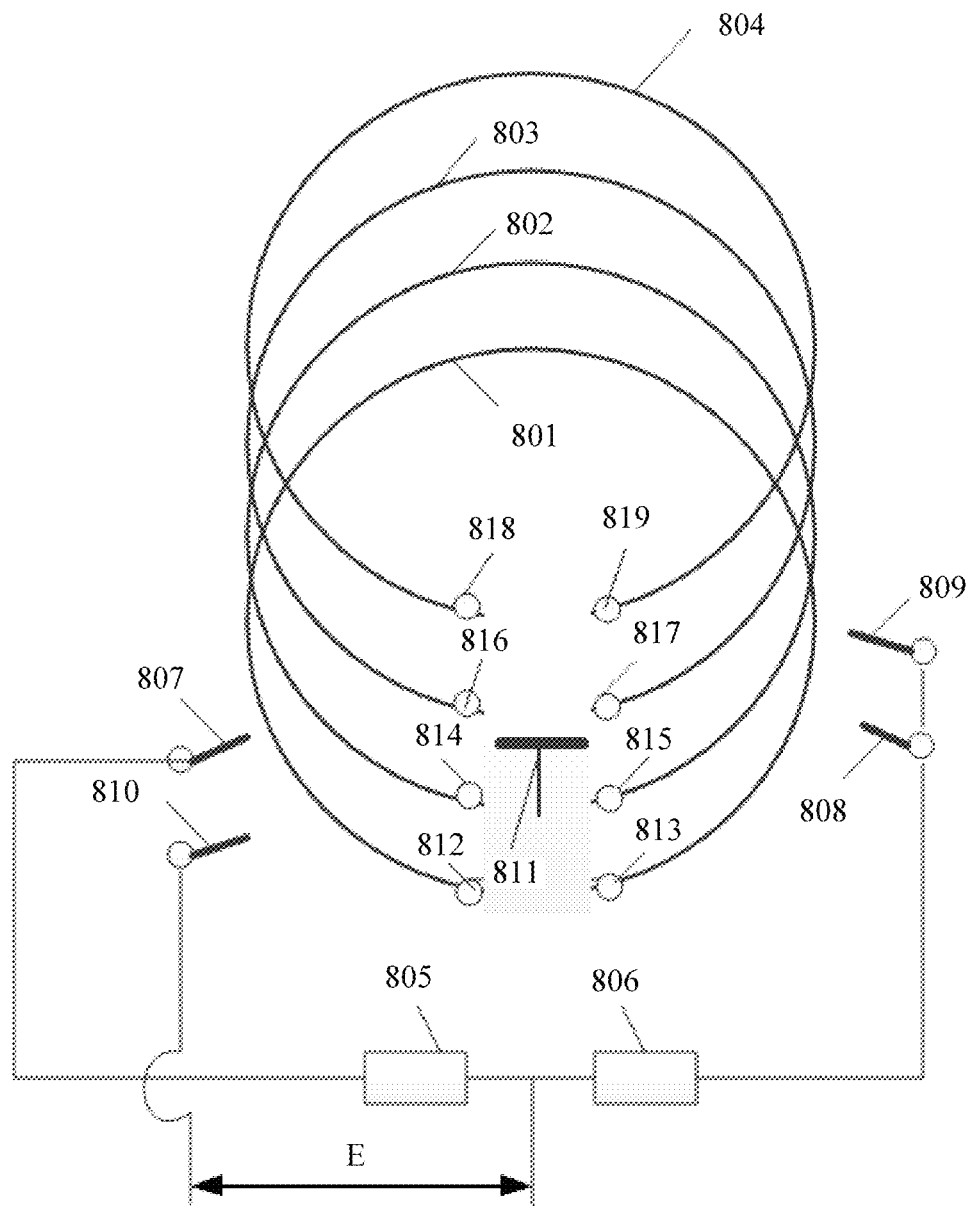
FIG. 8 is a schematic structural diagram of a detection apparatus according to this disclosure.

First, FIG. 8 shows a detection apparatus according to an embodiment of this disclosure. The detection apparatus includes a detection coil. The detection coil is a planar coil, and includes a first group of coils 801, a second group of coils 802, a third group of coils 803, and a fourth group of coils 804 that are continuously wound and coaxial. The second group of coils 802 is located between the third group of coils 803 and the first group of coils 801, and the third group of coils 803 is located between the fourth group of coils 804 and the second group of coils 802.

Each group of coils includes at least one turn of coil, and turns of coils in each group of coils are coaxial.

The detection apparatus further includes a first voltage divider resistor 805, a second voltage divider resistor 806, a first switch 807, a second switch 808, a third switch 809, a fourth switch 810, and a fifth switch 811.

One end of the first switch 807 is connected to one end of the first voltage divider resistor 805, and the other end of the first switch 807 is connected to a first end 812 of the first group of coils 801 or a first end 814 of the second group of coils 802. The other end of the first voltage divider resistor 805 is connected to one end of the second voltage divider resistor 806.

One end of the second switch 808 is connected to the other end of the second voltage divider resistor 806, and the other end of the second switch 808 is connected to a second end 817 of the third group of coils 803 or a second end 819 of the fourth group of coils 804. One end of the third switch 809 is connected to the other end of the second voltage divider resistor 806, and the other end of the third switch 809 is connected to a second end 815 of the second group of coils 802 or the second end 817 of the third group of coils 803.

One end of the fourth switch 810 is connected to the first end 814 of the second group of coils 802 or a first end 816 of the third group of coils 803. When a voltage is detected, a voltage between the other end of the fourth switch 810 and the other end of the first voltage divider resistor 805 is detected.

The fifth switch 811 is configured to connect the first end 816 of the third group of coils 803 and a second end 813 of the first group of coils 801, and connect a first end 818 of the fourth group of coils 804 and the second end 815 of the second group of coils 802.

There are the following two connection manners for the detection apparatus shown in FIG. 8.

Manner 1. When the other end of the first switch 807 is connected to the first end 812 of the first group of coils 801, the other end of the second switch 808 is connected to the second end 817 of the third group of coils 803. The other end of the third switch 809 is connected to the second end 815 of the second group of coils 802. The other end of the fourth switch 810 is connected to the first end 814 of the second group of coils 802. The fifth switch 811 is connected to the first end 816 of the third group of coils 803 and the second end 813 of the first group of coils 801.

When the detection apparatus shown in FIG. 7 uses the connection manner of the manner 1, the first group of coils 801, the second group of coils 802, and the third group of coils 803 constitute the detection apparatus shown in FIG. 7, and the detected voltage is a sum of a voltage at two ends of the first voltage divider resistor 805 and an induced electromotive force of the second group of coils 802.

Manner 2. When the other end of the first switch 807 is connected to the first end 814 of the second group of coils 802, the other end of the second switch 808 is connected to the second end 819 of the fourth group of coils 804. The other end of the third switch 809 is connected to the second end 817 of the third group of coils 803. The other end of the fourth switch 810 is connected to the first end 816 of the third group of coils 803. The fifth switch 811 is connected to the first end 818 of the fourth group of coils 804 and the second end 815 of the second group of coils 802.

When the detection apparatus shown in FIG. 8 uses the connection manner of the manner 2, the second group of coils 802, the third group of coils 803, and the fourth group of coils 804 constitute the detection apparatus shown in FIG. 7 (the second group of coils 802 shown in FIG. 8 corresponds to the first group of coils 702 shown in FIG. 7, the third group of coils 803 shown in FIG. 8 corresponds to the second group of coils 703 shown in FIG. 7, and the fourth group of coils 804 shown in FIG. 8 corresponds to the third group of coils 704 shown in FIG. 7), and the detected voltage is a sum of the voltage at two ends of the first voltage divider resistor 805 and an induced electromotive force of the third group of coils 803.

In the connection manner of the manner 1, a blind spot region is located near the second group of coils 802, and a detection region is a remaining region obtained after the blind spot region is removed from an annular region surrounded by the first group of coils 801 and the third group of coils 803. In the connection manner of the manner 2, a blind spot region is located near the third group of coils 803, and a detection region is a remaining region obtained after the blind spot region is removed from an annular region surrounded by the second group of coils 802 and the fourth group of coils 804. It may be found that the blind spot region in the connection manner of the manner 1 is located within the detection region in the connection manner of the manner 2, and the blind spot region in the connection manner of the manner 2 is located within the detection region in the connection manner of the manner 1.

The detection apparatus shown in FIG. 8 may implement blind spot detection by switching between two manners, to ensure that metal foreign matter can be detected more accurately and conveniently.

Figure 9:
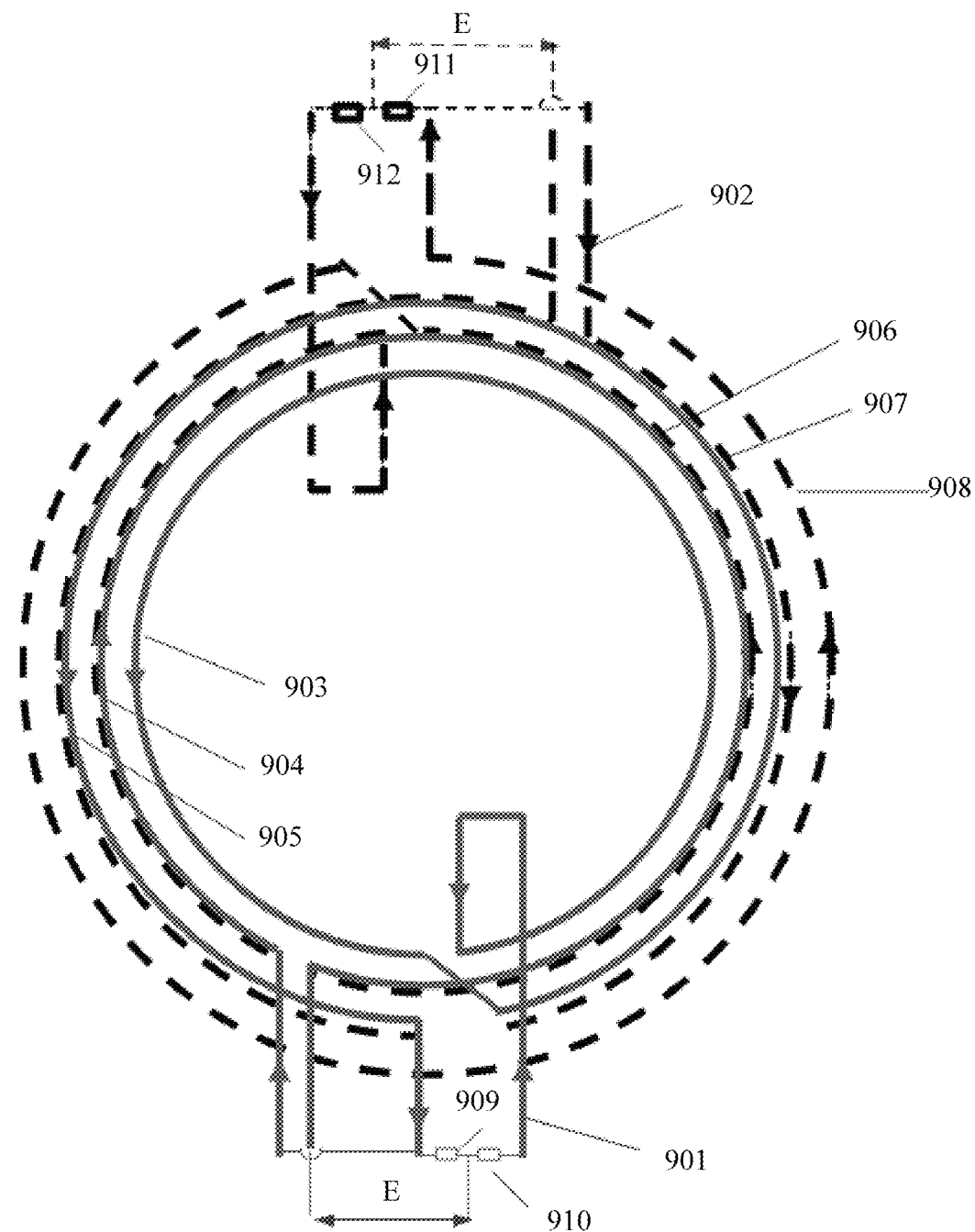
FIG. 9 is a schematic structural diagram of a detection apparatus according to this disclosure.

Second, FIG. 9 shows a detection apparatus according to an embodiment of this disclosure. The detection apparatus includes at least two detection units. Each detection unit includes three groups of coils. For one detection unit, a structure of the three groups of coils in the detection unit is the same as that of the detection coil shown in FIG. 3. Each detection unit may alternatively include three groups of coils and two voltage divider resistors. For one detection unit, a structure of the three groups of coils and the two voltage divider resistors in the detection unit is the same as that of the detection apparatus shown in FIG. 7.

In an example in which the detection apparatus includes two detection units a first detection unit 901 and a second detection unit 902 (to distinguish between the two different detection units, a coil in the first detection unit 901 is represented using a black dashed line, and a coil in the second detection unit 902 is represented using a gray solid line), a detection coil in the first detection unit 901 and a detection coil in the second detection unit 902 are located on a same plane. A first group of coils 903 of the first detection unit 901 is located on an inner side of a second group of coils 907 of the second detection unit 902. A second group of coils 904 of the first detection unit 901 is located between a first group of coils 906 and the second group of coils 907 of the second detection unit 902. A third group of coils 905 of the first detection unit 901 is located outside of the second group of coils 907 of the second detection unit 902.

For the first detection unit 901, a blind spot region of the first detection unit 901 is located near the second group of coils 904 of the first detection unit 901, and a detection region of the first detection unit 901 is a remaining region obtained after the blind spot region is removed from an annular region surrounded by the first group of coils 903 of the first detection unit 901 and the third group of coils 905 of the first detection unit 901. For the second detection unit 902, a blind spot region of the second detection unit 902 is located near the second group of coils 907 of the second detection unit 902, and a detection region of the second detection unit 902 is a remaining region obtained after the blind spot region is removed from an annular region surrounded by the first group of coils 906 of the second detection unit 902 and a third group of coils 908 of the second detection unit 902. It may be found that the blind spot region of the first detection unit 901 is located within the detection region of the second detection unit 902, and the blind spot region of the second detection unit 902 is located within the detection region of the first detection unit 901.

Specifically, the first detection unit 901 may use the structure of the detection coil shown in FIG. 3, and may use the manner of adjusting a coil area of each turn of coil in each group of coils and a quantity of coil turns of each group of coils, or may use the structure of the detection apparatus shown in FIG. 6, and may use the manner of adding a voltage divider resistor. In FIG. 8, in an example in which the first detection unit uses the structure of the detection apparatus shown in FIG. 6, the first detection unit 901 further includes a first voltage divider resistor 909 and a second voltage divider resistor 910. One end of the first voltage divider resistor 909 is connected to one end of the third group of coils 905 of the first detection unit 901, the other end of the first voltage divider resistor 909 is connected to one end of the second voltage divider resistor 910, and the other end of the second voltage divider resistor 910 is connected to one end of the first group of coils 903 of the first detection unit 901. In the first detection unit 901, a voltage between one end of the second group of coils 904 and one end of the first voltage divider voltage 909 connected to the second voltage divider resistor 910 may be detected. In an embodiment, a sum of the induced electromotive forces of the second group of coils 904 of the first detection unit 901 and a voltage of the first voltage divider resistor 909 is detected.

The second detection unit 902 may use the structure of the detection coil shown in FIG. 3, and may use the manner of adjusting a coil area of each turn of coil in each group of coils and a quantity of coil turns of each group of coils, or may use the structure of the detection apparatus shown in FIG. 6, and may use the manner of adding a voltage divider resistor. In FIG. 8, in an example in which the second detection unit uses the structure of the detection apparatus shown in FIG. 6, the second detection unit 902 further includes a third voltage divider resistor 911 and a fourth voltage divider resistor 912. One end of the third voltage divider resistor 911 is connected to one end of the third group of coils 908 of the second detection unit 902, the other end of the third voltage divider resistor 911 is connected to one end of the fourth voltage divider resistor 912, and the other end of the fourth voltage divider resistor 912 is connected to one end of the first group of coils 906 of the second detection unit 902. In the second detection unit 902, a voltage between one end of the second group of coils 907 of the second detection unit 902 and one end of the third voltage divider voltage 911 connected to the fourth voltage divider resistor 912 may be detected. In an embodiment, a sum of an induced electromotive force of the second group of coils 906 of the second detection unit 902 and a voltage of the third voltage divider resistor is detected.

The detection apparatus shown in FIG. 9 may implement blind spot detection using at least two detection units and in a manner in which a detection region of one detection unit covers a blind spot region of another detection unit, to ensure that a metal foreign matter can be detected more accurately and conveniently.

Apparently, a person skilled in the art can make various modifications and variations to this disclosure without departing from the spirit and scope of this disclosure. This disclosure is intended to cover these modifications and variations of this disclosure provided that they fall within the scope of protection defined by the following claims and their equivalent technologies.

What is claimed is:

1. A detection apparatus, comprising:
   a first voltage divider resistor comprising:
      a first end; and
      a second end;
   a second voltage divider resistor comprising:
      a third end coupled to the second end; and
      a fourth end; and
   a detection coil, wherein the detection coil is a planar coil comprising:
      a first group of coils coupled to the first end;
      a second group of coils; and
      a third group of coils coupled to the fourth end and the second group of coils such that the second group of coils is located between the first group of coils and the third group of coils,
      wherein the first group of coils, the second group of coils, and the third group of coils are coaxial and each comprise a turn of continuously-wound coil,
   wherein a voltage at the first end of the first voltage divider resistor and the second end of the first voltage divider resistor is equal to a first value of an induced electromotive force from the second group of coils in a first magnetic field when the detection apparatus is disposed in the first magnetic field, and wherein a first direction of the voltage is opposite to a second direction of the induced electromotive force.

2. The detection apparatus of claim 1, wherein the first group of coils, the second group of coils, and the third group of coils are coaxial with a coil that generates the first magnetic field.

3. The detection apparatus of claim 1, wherein the first group of coils, the second group of coils, or the third group of coils comprises a continuously wound multi-turn coaxial coil.

4. The detection apparatus of claim 1, wherein the first group of coils, the second group of coils, and the third group of coils meet a first formula when the first group of coils, the second group of coils, and the third group of coils have a same quantity of coil turns, wherein the first formula is as follows:

$$(\Delta\varphi_1 + \Delta\varphi_3) \times \frac{R1}{R1 + R2 + R} = \Delta\varphi_2,$$

wherein R1 is a resistance value of the first voltage divider resistor, R2 is a resistance value of the second voltage divider resistor, and R is a sum of resistance values of the first group of coils and the third group of coils, wherein $\Delta\varphi_1$ is a variation of a magnetic flux of a first turn of a first coil in the first group of coils in the first magnetic field in a time period $\Delta t$ and is based on a magnetic induction intensity of the first magnetic field and a first coil area of the first turn of the first coil, wherein $\Delta\varphi_2$ is a variation of a magnetic flux of a second turn of a second coil in the second group of coils in the first magnetic field in the time period $\Delta t$ and is based on the magnetic induction intensity of the first magnetic field and a second coil area of the second turn of the second coil, and wherein $\Delta\varphi_3$ is a variation of a magnetic flux of a third turn of a third coil in the third group of coils in the first magnetic field in the time period $\Delta t$ and related to the magnetic induction intensity of the first magnetic field and a third coil area of the third turn of the third coil.

5. The detection apparatus of claim 4, wherein the first group of coils, the second group of coils, and the third group of coils meet a second formula as follows:

$$\left(\Delta\int_{S1} Bds + \Delta\int_{S3} Bds\right) \times \frac{R1}{R1 + R2 + R} = \Delta\int_{S2} Bds,$$

wherein S1 is the first coil area, wherein S2 is the second coil area, wherein S3 is the third coil area, wherein $$\Delta\int_{S1} Bds$$

is the variation of the magnetic flux of the first turn of the first coil, wherein $$\Delta\int_{S2} Bds$$

is the variation of the magnetic flux of the second turn of the second coil, wherein $$\Delta\int_{S3} Bds$$

is the variation of the magnetic flux of the third turn of the third coil, and wherein B is the magnetic induction intensity of the first magnetic field in an area ds.

6. The detection apparatus of claim 1, wherein a quantity of coil turns of the first group of coils is N1, wherein a quantity of coil turns of the second group of coils is N2, wherein a quantity of coil turns of the third group of coils is N3, wherein N1, N2, and N3 are all positive integers greater than or equal to 1, and wherein the first group of coils, the second group of coils, and the third group of coils meet a first formula as follows:

$$(N1 \times \Delta\varphi_1 + N3 \times \Delta\varphi_3) \times \frac{R1}{R1 + R2 + R} = N2 \times \Delta\varphi_2,$$

wherein R1 is a resistance value of the first voltage divider resistor, R2 is a resistance value of the second voltage divider resistor, and R is a sum of resistance values of the first group of coils and the third group of coils, wherein $\Delta \varphi_1$ is a variation of a magnetic flux of a first turn of a first coil in the first group of coils in the first magnetic field in a time period $\Delta t$ and is based on a magnetic induction intensity of the first magnetic field and a first coil area of the first turn, wherein $\Delta \varphi_2$ is a variation of a magnetic flux of a second turn of a second coil in the second group of coils in the first magnetic field in the time period $\Delta t$ and is based on the magnetic induction intensity of the first magnetic field and a second coil area of the second turn of the second coil, wherein $\Delta \varphi_3$ is a variation of a magnetic flux of a third turn of a third coil in the third group of coils in the first magnetic field in the time period $\Delta t$ and is related to the magnetic induction intensity of the first magnetic field and a third coil area of the third turn of the third coil.

7. The detection apparatus of claim 6, wherein the first group of coils, the second group of coils, and the third group of coils meet a second formula as follows:

$$\left( N1 \times \Delta \int_{S1} Bds + N3 \times \Delta \int_{S3} Bds \right) \times \frac{R1}{R1 + R2 + R} = N2 \times \Delta \int_{S2} Bds,$$

wherein S1 is the first coil area, wherein S2 is the second coil area, wherein S3 is the coil area, wherein $$\Delta \int_{S1} Bds$$

is the variation of the magnetic flux of the first turn of the first coil, wherein $$\Delta \int_{S2} Bds$$

is the variation of the magnetic flux of the second turn of the second coil, wherein $$\Delta \int_{S3} Bds$$

is the variation of the magnetic flux of the third turn of the third coil, and wherein B is the magnetic induction intensity of the first magnetic field in an area ds.

8. The detection apparatus of claim 1, wherein the first group of coils, the second group of coils, or the third group of coils are centrally symmetrical to a transmit coil.

9. The detection apparatus of claim 1, wherein the first group of coils, the second group of coils, or the third group of coils are disposed in parallel with a transmit coil.

10. The detection apparatus of claim 1, wherein a sum of the voltage and the induced electromotive force is equal to zero.

11. A detection system comprising:
a transmit coil; and
a detection apparatus coupled to the transmit coil and comprising:
   a first voltage divider resistor comprising:
      a first end; and
      a second end;
   a second voltage divider resistor comprising:
      a third end coupled to the second end; and
      a fourth end; and
   a detection coil, wherein the detection coil is a planar coil comprising:
      a first group of coils coupled to the first end;
      a second group of coils; and
      a third group of coils coupled to the fourth end and the second group of coils such that the second group of coils is located between the first group of coils and the third group of coils,
   wherein the first group of coils, the second group of coils, and the third group of coils are coaxial and each comprise a turn of continuously-wound coil,
   wherein a voltage at the first end of the first voltage divider resistor and the second end of the first voltage divider resistor is equal to a first value of an induced electromotive force from the second group of coils in a first magnetic field when the detection apparatus is disposed in the first magnetic field, wherein a first direction of the voltage is opposite to a second direction of the induced electromotive force, and
   wherein the transmit coil is centrally symmetrical to the first group of coils, the second group of coils, and the third group of coils.

12. The detection system of claim 11, wherein the first group of coils, the second group of coils, or the third group of coils comprises a continuously wound multi-turn coaxial coil.

13. The detection system of claim 11, wherein the first group of coils, the second group of coils, and the third group of coils meet a first formula when the first group of coils, the second group of coils, and the third group of coils have a same quantity of coil turns, wherein the first formula is as follows:

$$(\Delta \varphi_1 + \Delta \varphi_3) \times \frac{R1}{R1 + R2 + R} = \Delta \varphi_2,$$

wherein R1 is a resistance value of the first voltage divider resistor, R2 is a resistance value of the second voltage divider resistor, and R is a sum of resistance values of the first group of coils and the third group of coils, wherein $\Delta \varphi_1$ is a variation of a magnetic flux of a first turn of a first coil in the first group of coils in the first magnetic field in a time period $\Delta t$ and is based on a magnetic induction intensity of the first magnetic field and a first coil area of the first turn of the first coil, wherein $\Delta \varphi_2$ is a variation of a magnetic flux of a second turn of a second coil in the second group of coils in the first magnetic field in the time period $\Delta t$ and is based on the magnetic induction intensity of the first magnetic field and a second coil area of the second turn of coil, and wherein $\Delta \varphi_3$ is a variation of a magnetic flux of a third turn of a third coil in the third group of coils in the first magnetic field in the time period $\Delta t$ and is related to the magnetic induction intensity of the first magnetic field and a third coil area of the third turn of the third coil.

14. The detection system of claim 13, wherein the first group of coils, the second group of coils, and the third group of coils meet a second formula as follows:

$$\left(\Delta \int_{S1} Bds + \Delta \int_{S3} Bds\right) \times \frac{R1}{R1 + R2 + R} = \Delta \int_{S2} Bds,$$

wherein S1 is the first coil area, wherein S2 is the second coil area, wherein S3 is the third coil area, wherein $$\Delta \int_{S1} Bds$$

is the variation of the magnetic flux of the first turn of the first coil, wherein $$\Delta \int_{S2} Bds$$

is the variation of the magnetic flux of the second turn of the second coil, wherein $$\Delta \int_{S3} Bds$$

is the variation of the magnetic flux of the third turn of the third coil, and wherein B is the magnetic induction intensity of the first magnetic field in an area ds.

15. The detection system of claim 11, wherein a quantity of coil turns of the first group of coils is N1, wherein a quantity of coil turns of the second group of coils is N2, wherein a quantity of coil turns of the third group of coils is N3, wherein N1, N2, and N3 are all positive integers greater than or equal to 1, and wherein the first group of coils, the second group of coils, and the third group of coils meet a first formula as follows:

$$(N1 \times \Delta\varphi_1 + N3 \times \Delta\varphi_3) \times \frac{R1}{R1 + R2 + R} = N2 \times \Delta\varphi_2,$$

wherein R1 is a resistance value of the first voltage divider resistor, R2 is a resistance value of the second voltage divider resistor, and R is a sum of resistance values of the first group of coils and the third group of coils, wherein $\Delta\varphi_1$ is a variation of a magnetic flux of a first turn of a first coil in the first group of coils in the first magnetic field in a time period $\Delta t$ and is based on a magnetic induction intensity of the first magnetic field and a first coil area of the first turn, wherein $\Delta\varphi_2$ is a variation of a magnetic flux of a second turn of a second coil in the second group of coils in the first magnetic field in the time period $\Delta t$ and is based on the magnetic induction intensity of the first magnetic field and a second coil area of the second turn of the second coil, and wherein $\Delta\varphi_3$ is a variation of a magnetic flux of a third turn of a third coil in the third group of coils in the first magnetic field in the time period $\Delta t$ and is related to the magnetic induction intensity of the first magnetic field and a third coil area of the third turn of the third coil.

16. The detection system of claim 15, wherein the first group of coils, the second group of coils, and the third group of coils meet a second formula as follows:

$$\left(N1 \times \Delta \int_{S1} Bds + N3 \times \Delta \int_{S3} Bds\right) \times \frac{R1}{R1 + R2 + R} = N2 \times \Delta \int_{S2} Bds,$$

wherein S1 is the first coil area, wherein S2 is the second coil area, wherein S3 is the third coil area, wherein $$\Delta \int_{S1} Bds$$

is the variation of the magnetic flux of the first turn of the first coil, wherein $$\Delta \int_{S2} Bds$$

is the variation of the magnetic flux of the second turn of the second coil, wherein $$\Delta \int_{S3} Bds$$

is the variation of the magnetic flux of the third turn of the third coil, and wherein B is the magnetic induction intensity of the first magnetic field in an area ds.

17. The detection system of claim 11, further comprising a transmit end coupled to the transmit coil to supply electrical energy to the transmit coil.

18. The detection system of claim 11, wherein the first group of coils, the second group of coils, and the third group of coils are coaxial with a coil that generates the first magnetic field.

19. The detection system of claim 11, wherein the first group of coils, the second group of coils, or the third group of coils are disposed in parallel with the transmit coil.

20. The detection system of claim 11, wherein a sum of the voltage and the induced electromotive force is equal to zero.

* * * * *

UNITED STATES PATENT AND TRADEMARK OFFICE
CERTIFICATE OF CORRECTION

PATENT NO. : 11,796,709 B2
APPLICATION NO. : 17/096054
DATED : October 24, 2023
INVENTOR(S) : Mou He, Wei Chen and Yongfa Zhu It is certified that error appears in the above-identified patent and that said Letters Patent is hereby corrected as shown below:

In the Claims

Claim 6, Column 35, Line 39: "period At and" should read "period $\Delta$t and"

Signed and Sealed this
Twelfth Day of December, 2023

Katherine Kelly Vidal
*Director of the United States Patent and Trademark Office*